US012132952B1

(12) United States Patent
Dhanapalan et al.

(10) Patent No.: US 12,132,952 B1
(45) Date of Patent: Oct. 29, 2024

(54) ACCESSORY CONTROL USING KEYWORDS

(71) Applicant: Amazon Technologies, Inc., Seattle, WA (US)

(72) Inventors: Ajay Kumar Dhanapalan, San Jose, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 53 days.

(21) Appl. No.: 17/895,661

(22) Filed: Aug. 25, 2022

(51) Int. Cl.
| | |
|---|---|
| H04N 21/439 | (2011.01) |
| H04N 21/422 | (2011.01) |
| H04N 21/4363 | (2011.01) |
| H04N 21/44 | (2011.01) |

(52) U.S. Cl.
CPC ... *H04N 21/4394* (2013.01); *H04N 21/42203* (2013.01); *H04N 21/43637* (2013.01); *H04N 21/44* (2013.01)

(58) Field of Classification Search
CPC ......... H04N 21/4394; H04N 21/42203; H04N 21/43637; H04N 21/44
See application file for complete search history.

(56) References Cited

U.S. PATENT DOCUMENTS

| | | | | |
|---|---|---|---|---|
| 6,065,042 A * | 5/2000 | Reimer | ........ | G06F 16/78 |
| | | | | 348/E7.071 |
| 6,324,512 B1 * | 11/2001 | Junqua | ........ | H04N 21/42203 |
| | | | | 704/256.1 |
| 6,330,537 B1 * | 12/2001 | Davis | ........ | H04N 21/454 |
| | | | | 704/271 |
| 6,415,257 B1 * | 7/2002 | Junqua | ........ | H04N 21/42203 |
| | | | | 704/275 |
| 6,513,006 B2 * | 1/2003 | Howard | ........ | H04N 21/42203 |
| | | | | 704/E15.045 |
| 6,658,662 B1 * | 12/2003 | Nielsen | ........ | H04N 7/16 |
| | | | | 348/E7.054 |
| 7,035,468 B2 * | 4/2006 | Yogeshwar | ........ | G06F 16/71 |
| | | | | 707/E17.031 |
| 7,092,888 B1 * | 8/2006 | McCarthy | ........ | G10L 15/1822 |
| | | | | 704/277 |
| 7,110,664 B2 * | 9/2006 | Yogeshwar | ........ | H04N 5/76 |
| | | | | 386/328 |
| 7,664,678 B1 * | 2/2010 | Haber | ........ | G06Q 30/0639 |
| | | | | 705/26.9 |

(Continued)

*Primary Examiner* — Michael B. Pierorazio
(74) *Attorney, Agent, or Firm* — Pierce Atwood LLP

(57) ABSTRACT

A system configured to use keywords to augment audio playback with visual effects and/or other effects to provide an immersive audio experience. For example, a device can detect a keyword and control a color and intensity of external lights to provide visual feedback. In addition to visual effects, the device can trigger additional effects using smart plugs or other smart devices. In a listening enhancement mode in which the device outputs audio content, the device performs keyword detection by monitoring playback audio data for preconfigured keywords. In a storytelling mode in which a user reads a book out loud, the device may perform keyword detection by monitoring microphone audio data for the preconfigured keywords. Controlling the visual effects in response to keyword detection is enabled by a new pipeline that sends information back from a wakeword engine to an audio processor.

22 Claims, 21 Drawing Sheets

(56) References Cited

U.S. PATENT DOCUMENTS

| | | | | |
|---|---|---|---|---|
| 7,774,815 B1* | 8/2010 | Allen | H04N 21/8133 | 725/51 |
| 7,801,910 B2* | 9/2010 | Houh | G06F 16/583 | 707/765 |
| 7,814,524 B2* | 10/2010 | Candelore | H04N 21/47 | 725/39 |
| 7,908,628 B2* | 3/2011 | Swart | H04N 21/6377 | 725/135 |
| 8,079,054 B1* | 12/2011 | Dhawan | H04N 21/812 | 705/14.6 |
| 8,209,724 B2* | 6/2012 | Rathod | H04N 21/435 | 348/715 |
| 8,296,808 B2* | 10/2012 | Hardacker | H04N 21/482 | 725/51 |
| 8,423,363 B2* | 4/2013 | Gupta | G10L 15/22 | 704/251 |
| 8,572,488 B2* | 10/2013 | Phillips | G06F 3/0482 | 715/716 |
| 8,984,568 B2* | 3/2015 | Mickelsen | H04N 21/8545 | 725/74 |
| 9,462,340 B1* | 10/2016 | Mathurin | H04N 21/8106 | |
| 2002/0093591 A1* | 7/2002 | Gong | H04N 21/2368 | 348/E7.063 |
| 2002/0133562 A1* | 9/2002 | Newnam | G06Q 30/02 | 709/216 |
| 2002/0162117 A1* | 10/2002 | Pearson | H04N 21/4758 | 725/135 |
| 2002/0170068 A1* | 11/2002 | Rafey | H04N 21/4782 | 348/E7.071 |
| 2003/0025832 A1* | 2/2003 | Swart | H04N 21/4828 | 348/E7.071 |
| 2003/0206717 A1* | 11/2003 | Yogeshwar | G11B 27/10 | 386/328 |
| 2004/0073493 A1* | 4/2004 | Kato | H04N 7/17318 | 348/E7.071 |
| 2004/0096110 A1* | 5/2004 | Yogeshwar | G06F 16/51 | 707/E17.031 |
| 2005/0066352 A1* | 3/2005 | Herley | H04N 21/42203 | 348/E7.071 |
| 2005/0188411 A1* | 8/2005 | Dacosta | G06F 16/4387 | 348/E7.071 |
| 2006/0015339 A1* | 1/2006 | Charlesworth | G10L 15/187 | 704/E15.02 |
| 2007/0061862 A1* | 3/2007 | Berger | H04N 7/163 | 725/62 |
| 2007/0112837 A1* | 5/2007 | Houh | G06F 16/489 | 707/E17.02 |
| 2007/0124756 A1* | 5/2007 | Covell | G06F 16/635 | 348/E7.071 |
| 2007/0124788 A1* | 5/2007 | Wittkoter | H04N 7/165 | 348/E7.071 |
| 2008/0091713 A1* | 4/2008 | Candelore | H04N 7/163 | |
| 2008/0097984 A1* | 4/2008 | Candelore | H04N 21/4332 | 707/999.005 |
| 2008/0204595 A1* | 8/2008 | Rathod | H04N 21/44008 | 348/E7.001 |
| 2008/0262996 A1* | 10/2008 | Yogeshwar | G06F 16/71 | 707/E17.031 |
| 2008/0266449 A1* | 10/2008 | Rathod | H04N 21/8133 | 348/E7.001 |
| 2008/0285940 A1* | 11/2008 | Kulas | H04N 21/4858 | 386/353 |
| 2009/0094632 A1* | 4/2009 | Newnam | H04N 21/43074 | 725/24 |
| 2009/0112592 A1* | 4/2009 | Candelore | H04N 21/42203 | 704/E15.001 |
| 2009/0293081 A1* | 11/2009 | Pirani | H04N 21/4334 | 707/999.003 |
| 2009/0299752 A1* | 12/2009 | Rodriguez | G06F 40/242 | 704/E15.001 |
| 2010/0316131 A1* | 12/2010 | Shanableh | H04N 19/61 | 375/E7.011 |
| 2011/0069940 A1* | 3/2011 | Shimy | H04N 21/4532 | 386/296 |
| 2011/0145883 A1* | 6/2011 | Godar | H04N 5/445 | 725/131 |
| 2011/0283189 A1* | 11/2011 | McCarty | H04N 21/4532 | 715/810 |
| 2011/0289530 A1* | 11/2011 | Dureau | G06F 16/48 | 725/38 |
| 2012/0016678 A1* | 1/2012 | Gruber | G06F 16/3344 | 704/E21.001 |
| 2012/0210349 A1* | 8/2012 | Campana | G06F 3/1438 | 725/78 |
| 2013/0198786 A1* | 8/2013 | Cook | H05B 47/19 | 725/78 |
| 2013/0254795 A1* | 9/2013 | Botta | H04N 21/4542 | 725/28 |
| 2014/0181865 A1* | 6/2014 | Koganei | H04N 21/4312 | 725/38 |
| 2014/0278834 A1* | 9/2014 | Lautz | G06Q 30/0245 | 705/12 |
| 2014/0350925 A1* | 11/2014 | Park | G10L 15/22 | 704/231 |
| 2014/0373082 A1* | 12/2014 | Miyazaki | H04N 21/4415 | 725/110 |
| 2015/0082349 A1* | 3/2015 | Ishtiaq | H04N 21/4316 | 725/40 |
| 2015/0229975 A1* | 8/2015 | Shaw | H04N 21/6587 | 725/10 |
| 2016/0150294 A1* | 5/2016 | Phatak | H04N 21/4126 | 725/23 |

* cited by examiner

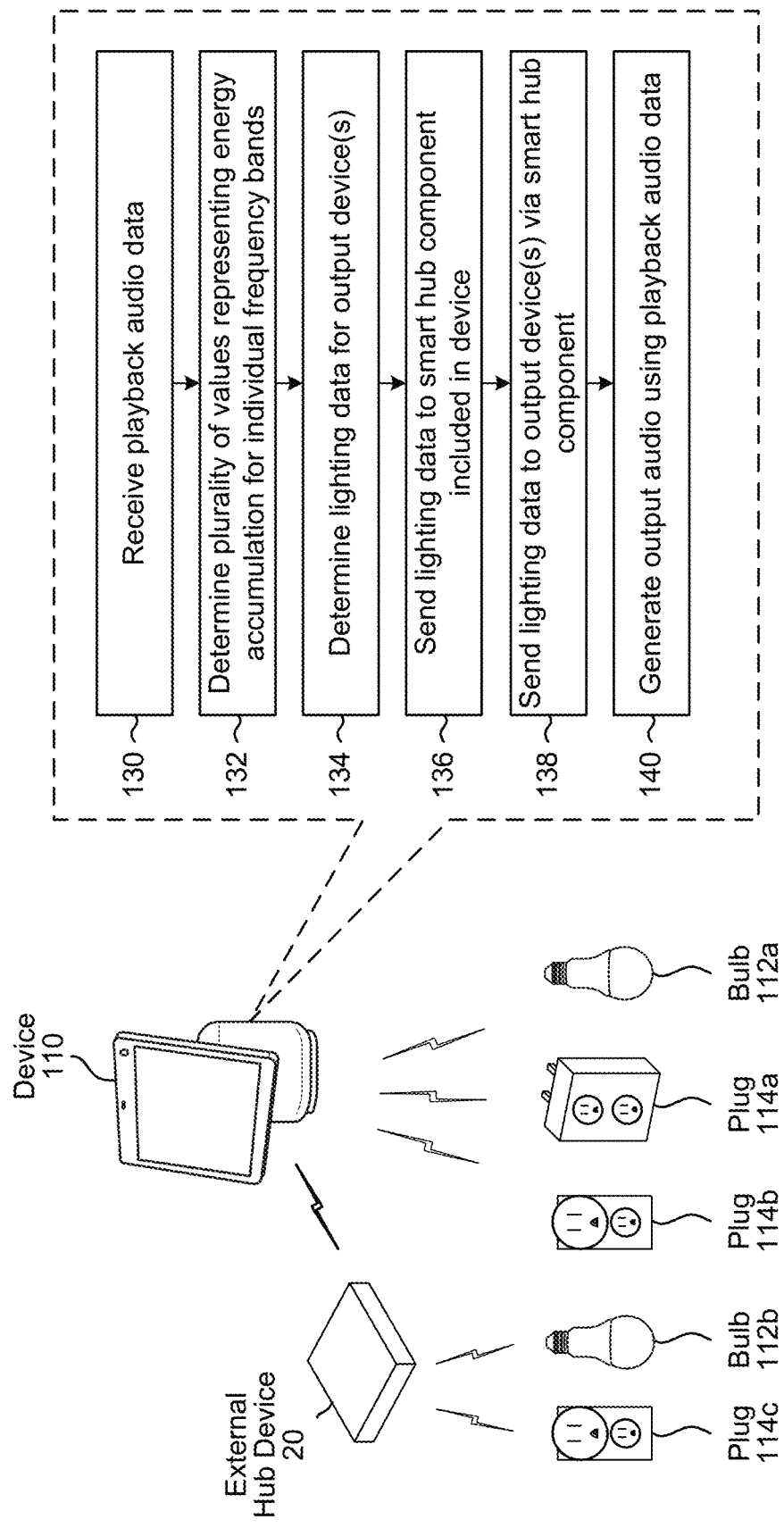

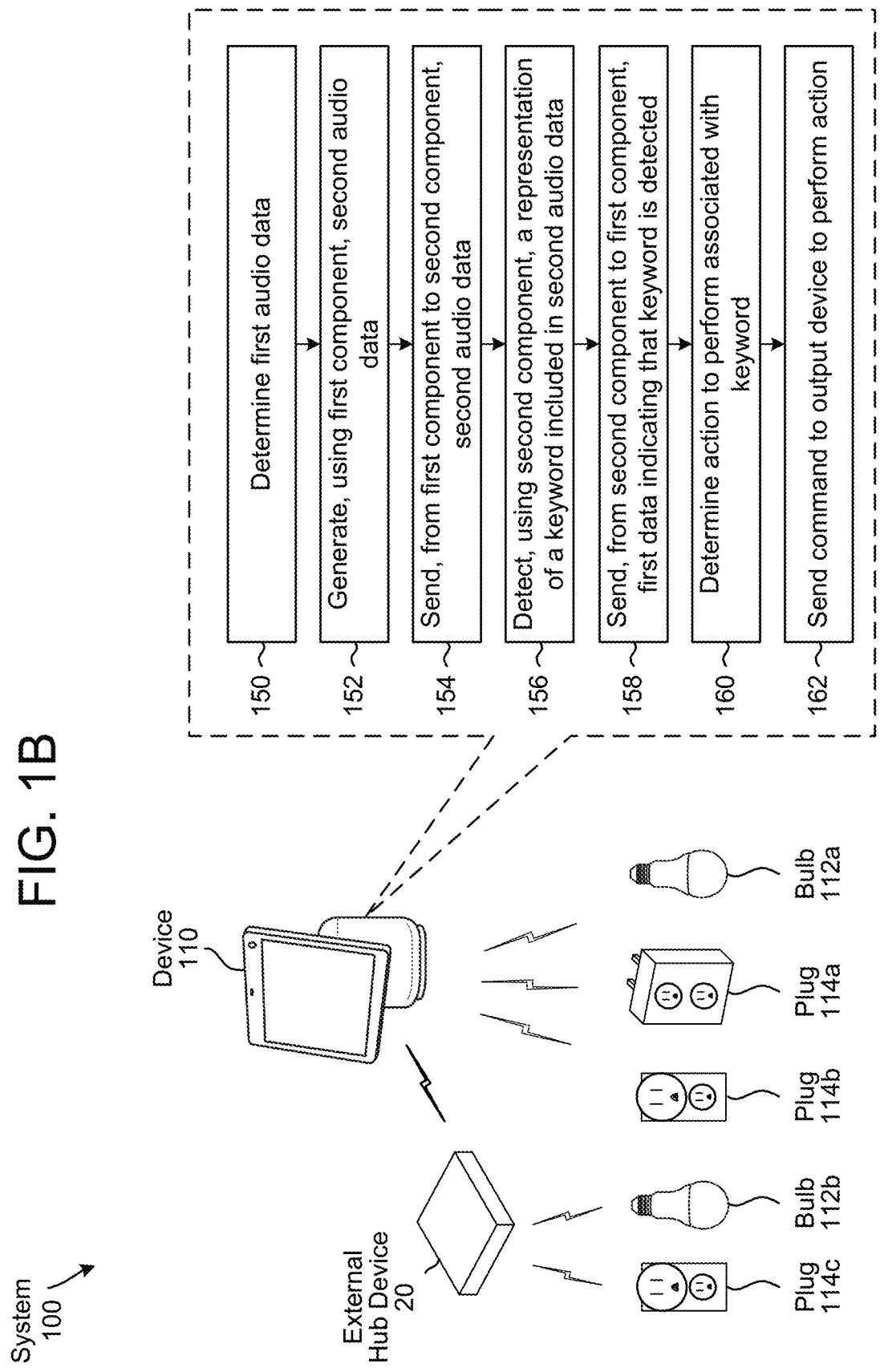

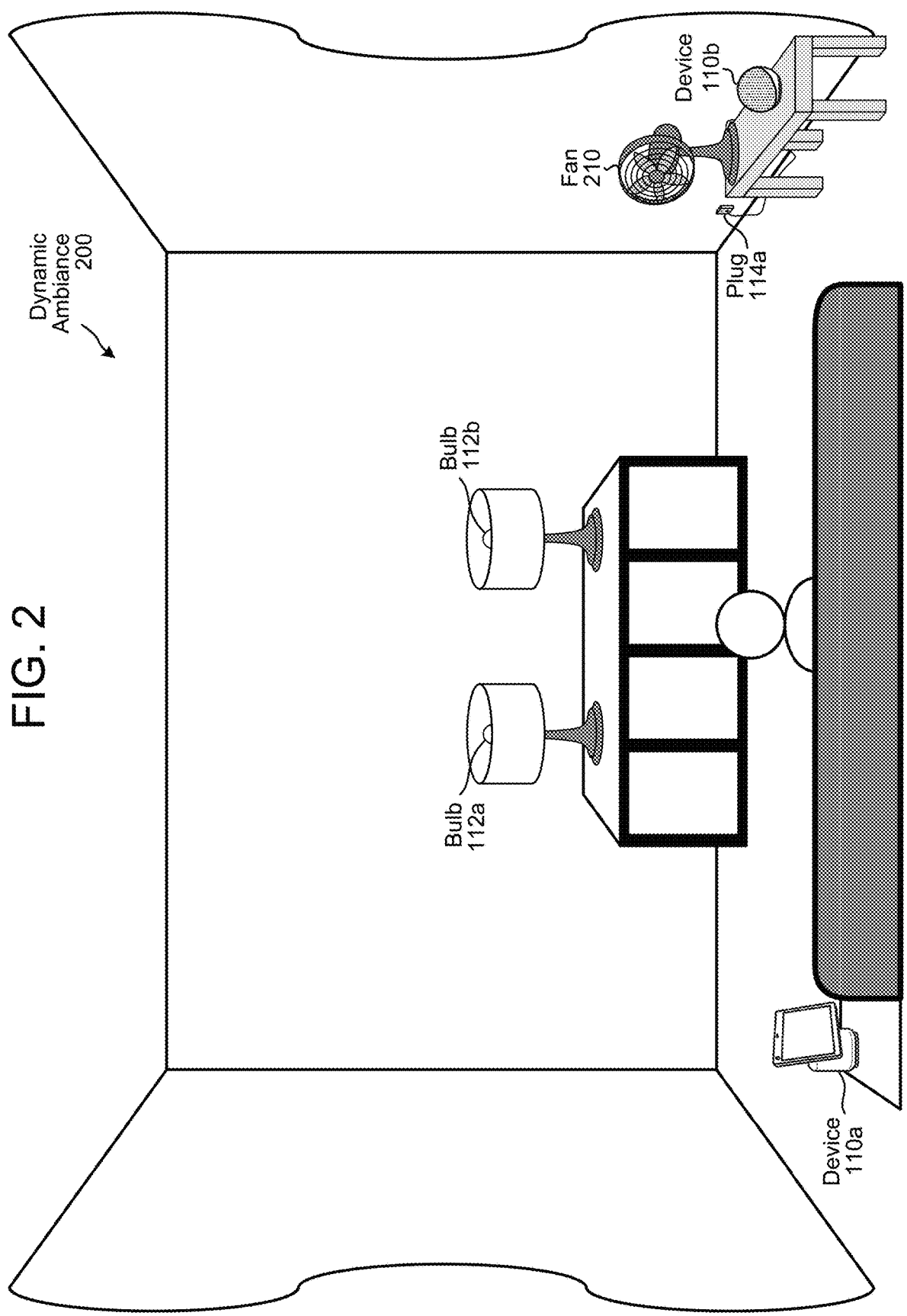

External Hub Example 300

Embedded Smart Hub Example 350

Audio Source Examples 400

Special Effects Generation 450

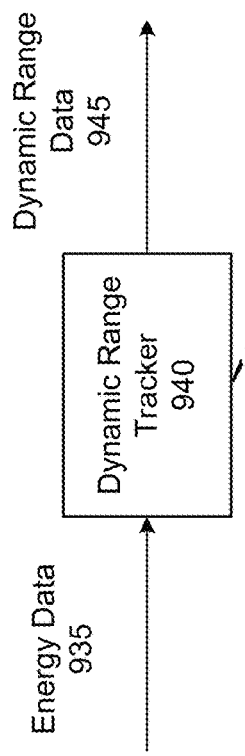
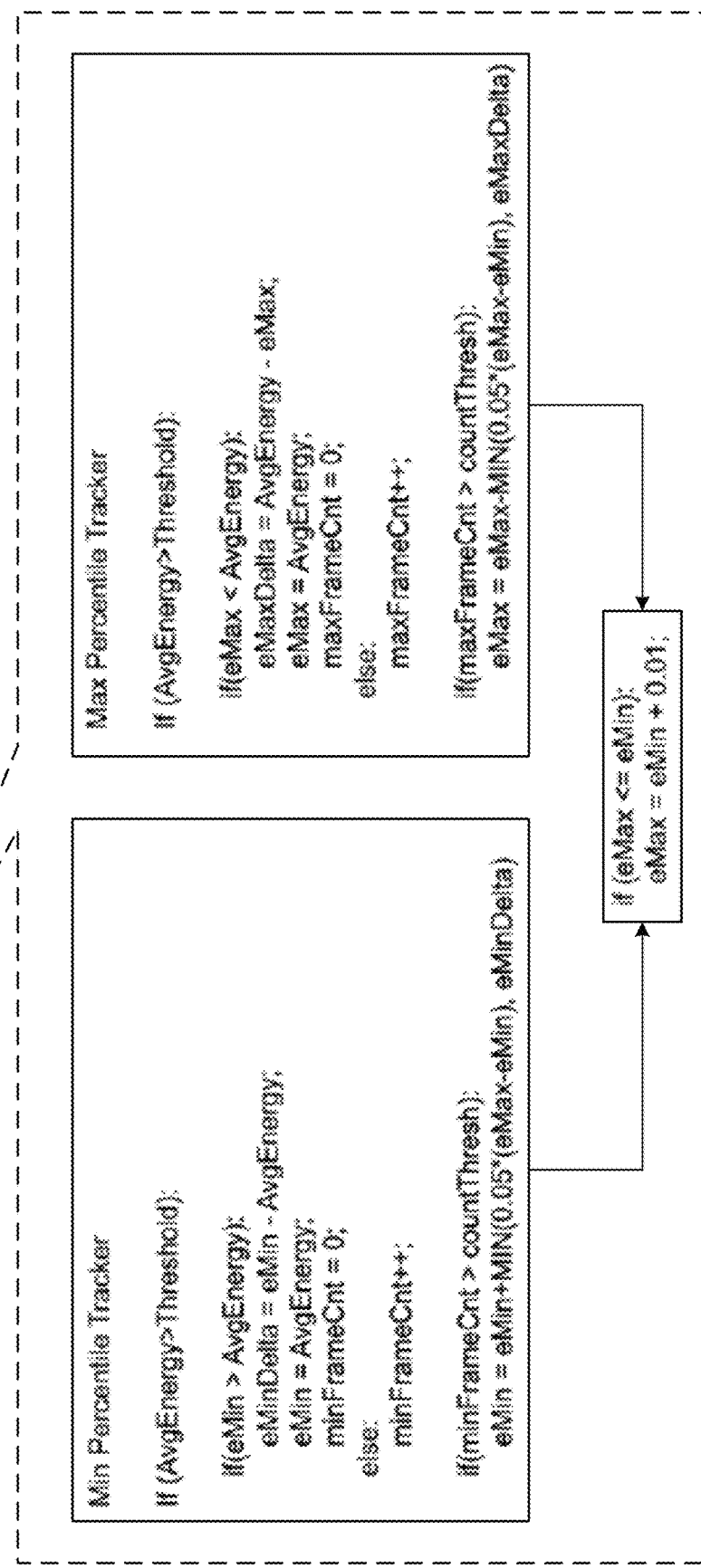
FIG. 12

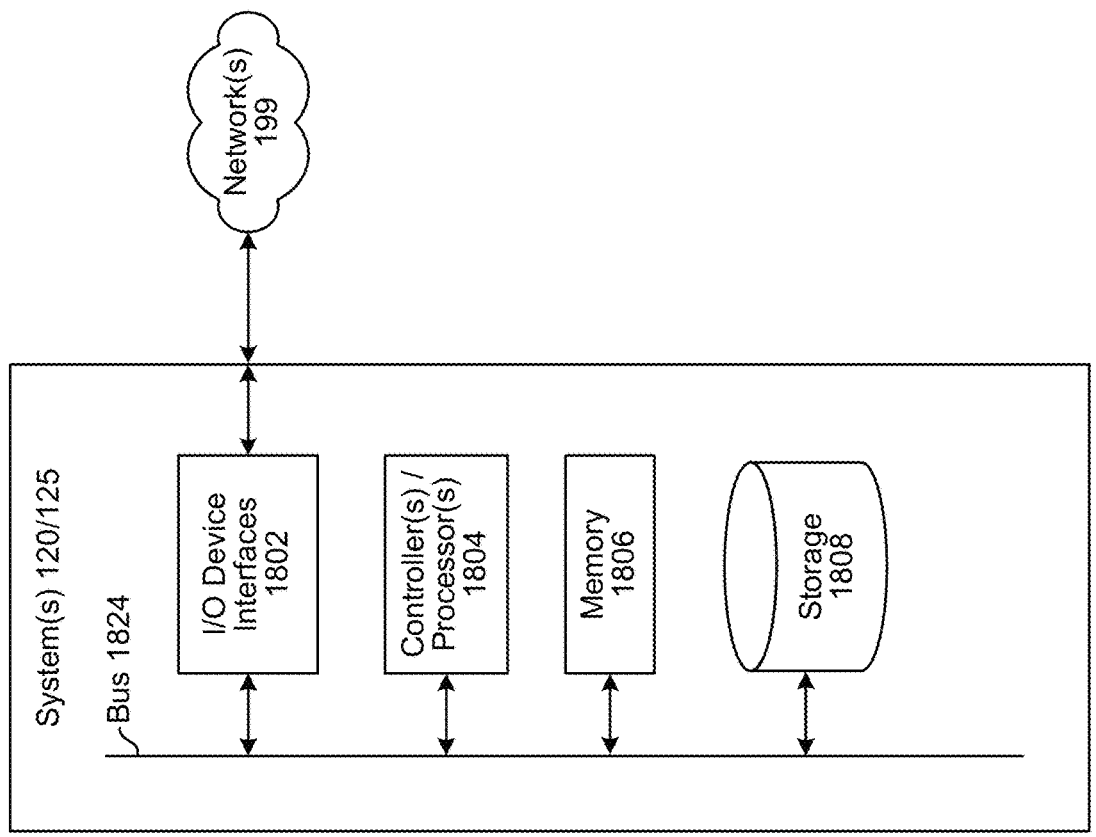

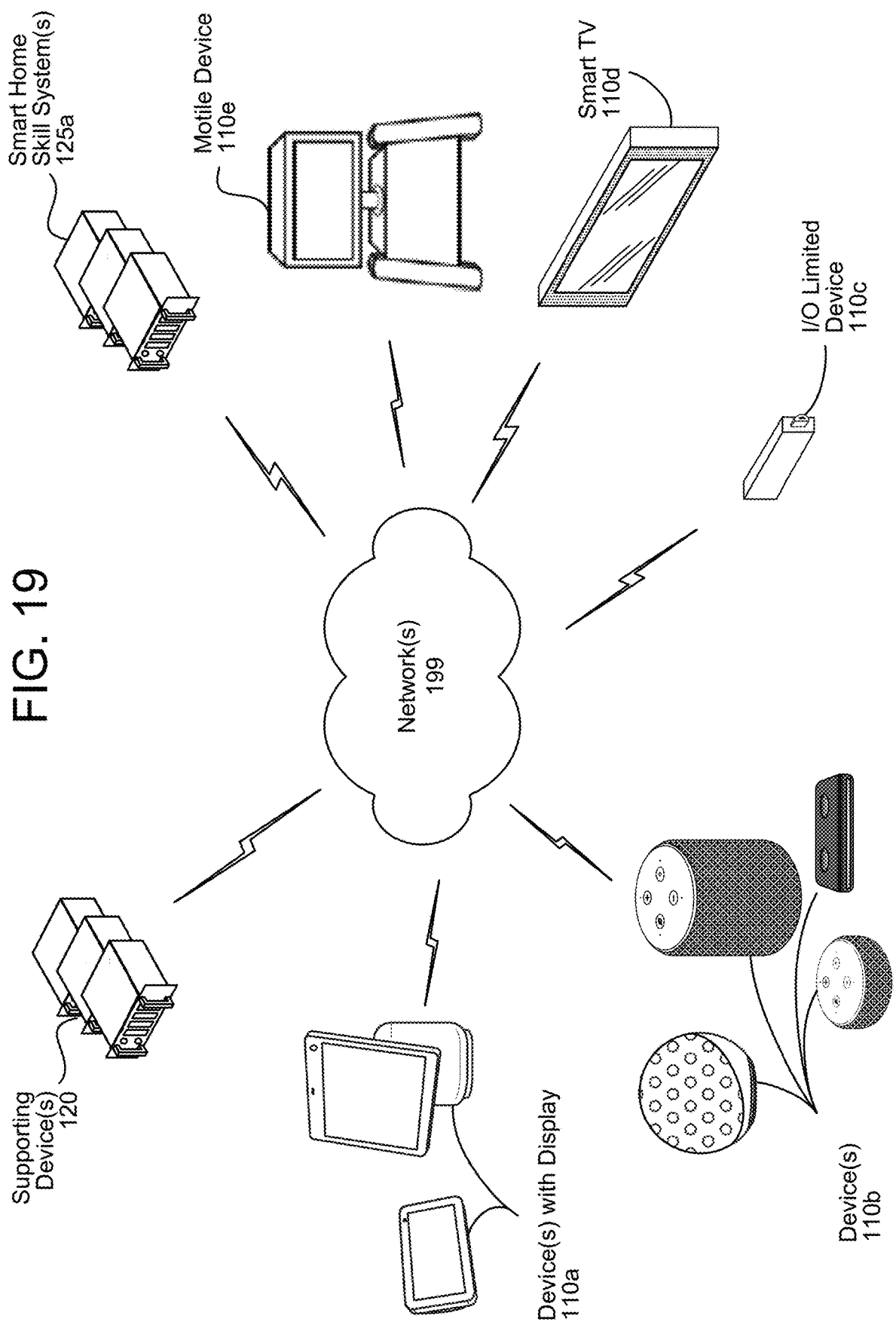

ACCESSORY CONTROL USING KEYWORDS

BACKGROUND

With the advancement of technology, the use and popularity of electronic devices has increased considerably. Electronic devices are commonly used to process and output audio data.

BRIEF DESCRIPTION OF DRAWINGS

For a more complete understanding of the present disclosure, reference is now made to the following description taken in conjunction with the accompanying drawings.

FIG. 1A is a conceptual diagram illustrating a system configured augment audio playback with visual effects according to embodiments of the present disclosure.

FIG. 1B is a conceptual diagram illustrating a system configured to augment audio playback with special effects using keyword detection according to embodiments of the present disclosure.

FIG. 2 illustrates an example of enabling dynamic ambiance according to embodiments of the present disclosure.

FIG. 12 illustrates an example of performing dynamic range tracking according to embodiments of the present disclosure.

FIG. 18 is a block diagram conceptually illustrating example components of a system, according to embodiments of the present disclosure.

FIG. 19 illustrates an example of device(s) included in the overall system, according to embodiments of the present disclosure.

DETAILED DESCRIPTION

Figure 3A:
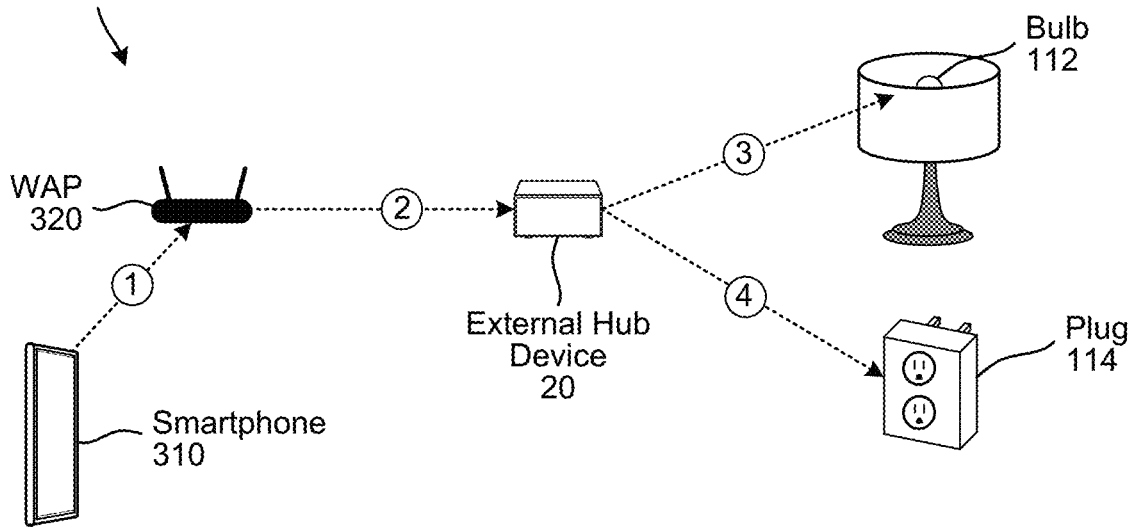
FIG. 3A illustrates an external hub example that results in high latency.

Electronic devices may be used to process output audio data and generate output audio. The output audio may be associated with media content, such as audio corresponding to music, an audiobook, or other media content. In addition, devices may be used to capture input audio and process input audio data.

To augment audio playback, devices, systems and methods are disclosed that provide dynamic visual feedback by synchronizing smart lights with a rhythm and energy levels of music being output. For example, a device may translate audio samples to luma (brightness), chroma (color), and location data using a low-latency algorithm. For example, the device may divide the full band audio data into separate frequency bands based on the number of output devices and control a brightness for an output device by tracking energy within a corresponding frequency band. The color and location may be controlled based on a number of beats per minute, which channel the audio is being played in, a direction associated with an audible sound, and/or the like. In addition to controlling external lighting via a smart home hub, the device can control LED light(s) on the device via an LED controller. To further reduce the latency, the device can directly communicate between an audio processor, the smart home hub, and/or the LED controller using low level hardware abstraction layers (HALs).

FIG. 1A is a conceptual diagram illustrating a system configured augment audio playback with visual effects according to embodiments of the present disclosure. As illustrated in FIG. 1A, a system 100 may include a device 110 that may communicate with a plurality of smart bulbs 112 and/or smart plugs 114 either directly or via an external hub device 20. For example, the device 110 may include a smart hub component that enables the device 110 to directly communicate with a first smart bulb 112a, a first smart plug 114a, and a second smart plug 114b. In addition, the device 110 may indirectly communicate with a second smart bulb 112b and a third smart plug 114c via the external hub device 20. While FIG. 1A illustrates the device 110 connecting to the first smart bulb 112a and smart plugs 114a-114b, the disclosure is not limited thereto and the device 110 may connect to any number of devices 110, smart bulbs 112, smart plugs 114, and/or the like without departing from the disclosure.

The device 110 may be an electronic device configured to capture and/or receive audio data. For example, the device 110 may include a microphone array that is configured to generate input audio data using one or more microphones, although the disclosure is not limited thereto and the device 110 may include multiple individual microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive playback audio data and generate output audio using one or more loudspeakers of the device 110. For example, the device 110 may generate output audio corresponding to media content, such as music, a movie, an audiobook, and/or the like.

As the device 110 includes an embedded smart home hub component, the device 110 may be referred to as a hub device 110 without departing from the disclosure. A hub device may be referred to as a "home controller," gateway and/or other type of "hub," and may assist in controlling associated smart-home devices. In some examples, smart devices may be paired to the hub device, typically by following instructions to physically place the smart device and the hub device into a join mode, which may also be described as a pairing mode, and/or by utilizing a hub-associated application stored on and/or accessed by a web and/or mobile phone. Thereafter, the hub device may be utilized to control operations associated with the smart device. As illustrated in FIG. 1A, the first hub device 110a may correspond to a device 110 that is configured to interpret voice commands, generate output audio, and/or perform other functionality while also connecting to one or more devices (e.g., smart bulb 112a, smart plugs 114a-114b). In contrast, the external hub device 20 may be configured specifically to connect to one or more devices (e.g., smart bulb 112b, smart plug 114c, etc.) without performing additional functionality without departing from the disclosure.

The devices 110, bulbs 112, plugs 114, and/or the like that connect to the hub device 110a may be described as "smart" devices, which may have certain computing components and be configured to send and/or receive data from other devices. For example, these smart devices may correspond to light bulbs, plugs, locks, televisions, appliances, doorbells, cameras, etc. These devices 112/114 may be "paired" or otherwise associated with a voice-enabled device (e.g., devices 110), a hub device (e.g., hub device 110a), and/or a user account, although the disclosure is not limited thereto.

The device 110 may be configured to generate special effects that augment audio playback. For example, the device 110 may process audio data and generate special effects that are synchronized with the audio playback, enabling a dynamic ambiance that varies based on the content and is timed in coordination with the audio playback. In some examples, the special effects may correspond to visual effects. For example, the system 100 may control a color and/or intensity of a plurality of lights (e.g., smart bulbs 112, light-emitting diode (LED) components associated with a device 110, and/or the like) without departing from the disclosure. However, the disclosure is not limited thereto and the special effects may correspond to physical effects, sound effects, and/or other effects depending on functionality available to the system 100. For example, the system 100 may control whether power is provided to various output devices using one or more smart plugs 114, enabling the system 100 to generate additional effects corresponding to the individual output device.

To illustrate a first example, during music playback the system 100 may generate special effects that mimic professional entertainment equipment used in professional venues (e.g., during a music concert, in a nightclub, etc.), such as disco lights, strobe lights, spotlights, projectors, fog machines, and/or the like. To illustrate a second example, during audiobook playback the system 100 may create an immersive experience by generating special effects that correspond to content of the audiobook without departing from the disclosure. For example, the system 100 may generate special effects that physically manifest descriptive elements represented in the audiobook, creating conditions associated with things (e.g., waterfall, forest, city, etc.), weather phenomena (e.g., wind, fog, lightning, etc.), and/or the like, although the disclosure is not limited thereto. For ease of illustration, these physical special effects are described with regard to audiobook content, but the disclosure is not limited thereto and the system 100 may create an immersive experience using physical special effects for other content (e.g., movies, television shows, etc.) without departing from the disclosure.

To illustrate examples of the system 100 creating the immersive experience, the system 100 may control whether power is provided to various output devices using the smart plugs 114, enabling the system 100 to generate physical special effects corresponding to the individual output device. While these special effects may vary without departing from the disclosure, examples include controlling a directional light to generate a spotlight effect, controlling fixed lighting (e.g., strobe lights, multicolored party lights, Christmas lights, blacklights, ultraviolet lights, and/or the like) to generate a visual effect, controlling a fan to generate a wind effect, controlling a fog/smoke machine to generate a fog/smoke effect, controlling a humidifier to generate a mist effect, controlling a water fountain to generate a water effect, controlling a bubble machine to generate a bubble effect, and/or the like, although the disclosure is not limited thereto.

With regard to the visual effects, in some examples the system 100 may group all of the lights together and control a color and/or intensity for the entire group based on the audio playback in order to create a uniform visualization. For example, every light in the room may generate the same color, with the intensity of the color varying based on the audio content. In other examples, the system 100 may separate the lights into multiple groups and control a color and/or intensity for each individual group separately based on the audio content. For example, multiple groups of lights may generate the same color, with the intensity of the color varying between the groups, although the disclosure is not limited thereto and multiple groups of lights may generate different colors/intensities without departing from the disclosure. To illustrate an example, one or more first lights may generate a first visual effect using first lighting data generated using a first frequency range of the audio data, one or more second lights may generate a second visual effect using second lighting data generated using a second frequency range of the audio data, and so on. Thus, in some examples the groups of lights may represent spectral content of the audio content, creating a visual effect reminiscent of an equalizer, although the disclosure is not limited thereto.

As illustrated in FIG. 1A, the device 110 may receive (130) playback audio data, may determine (132) a plurality of values representing energy accumulation for individual frequency bands, and may determine (134) lighting data for output device(s), as described in greater detail below with regard to FIGS. 8-13. The device 110 may send (136) the lighting data to a smart hub component included in the device 110, may send (138) the lighting data to the output device(s) via the smart hub component, and may generate (140) output audio using playback audio data. Thus, the device 110 may generate an immersive experience by controlling the output device(s) in coordination with the output audio.

FIG. 1B is a conceptual diagram illustrating a system configured to augment audio playback with special effects using keyword detection according to embodiments of the present disclosure. As illustrated in FIG. 1B, the device 110 may generate additional special effects using keyword detection. For example, the device 110 may detect keywords represented in audio data and may perform one or more actions responsive to the keyword detected. To illustrate a first example, the device 110 may detect a first keyword (e.g., "forest") and generate a visual effect corresponding to the first keyword (e.g., set a color of the output devices to green). To illustrate a second example, the device 110 may detect a second keyword (e.g., "wind") and generate a physical effect corresponding to the second keyword (e.g., send a command to a smart plug 114 to provide power to a table fan). However, the disclosure is not limited thereto and the device 110 may generate a variety of visual effects, physical effects, and/or the like in response to a single keyword without departing from the disclosure.

In some examples, the device 110 may perform keyword detection as part of outputting audio content. For example, the device 110 may receive playback audio data corresponding to an audiobook or other media content and the device 110 may use the playback audio data to generate audio output. While generating the audio output, the device 110 may perform keyword detection to detect whether a preconfigured keyword is represented in the playback audio data. If a keyword is detected, the device 110 may determine one or more actions associated with the detected keyword and may generate special effects data corresponding to the one or more actions. However, the disclosure is not limited thereto, and in other examples the device 110 may perform keyword detection using microphone audio data, enabling a user to read a book while the device 110 generates special effects in response to certain keywords.

As illustrated in FIG. 1B, the device 110 may determine (150) first audio data, may generate (152), using a first component, second audio data, and may send (154), from the first component to a second component, the second audio data. The device 110 may detect (156), using the second component, a representation of a keyword included in the second audio data and may send (158), from the second component to the first component, first data indicating that the keyword is detected. The device 110 may then determine (160) an action to perform that is associated with the keyword and may send (162) a command to an output device to perform the action.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones configured to capture sound and pass the resulting audio signal created by the sound to a downstream component. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. A particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, although the disclosure is not limited thereto.

In some examples, a time-domain signal may be represented as microphone audio data z(t), which is comprised of a sequence of individual samples of audio data. Thus, z(t) denotes an individual sample that is associated with a time t. While the microphone audio data z(t) is comprised of a plurality of samples, the disclosure is not limited thereto and in other examples the device 110 may group a plurality of samples and process them together. For example, the device 110 may group a number of samples together in a frame to generate microphone audio data z(n). As used herein, a variable z(n) corresponds to the time-domain signal and identifies an individual frame (e.g., fixed number of samples s) associated with a frame index n.

In some examples, the device 110 may convert microphone audio data z(t) from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) as a first time-domain signal associated with a first subband (e.g., first frequency range), a second bandpass filter may output a second portion of the microphone audio data z(t) as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) in the time-domain to microphone audio data z(t, k) in the subband-domain. However, the disclosure is not limited thereto, and the device 110 may convert microphone audio data z(n) in the time-domain to microphone audio data z(n, k) the subband-domain without departing from the disclosure.

Additionally or alternatively, the device 110 may convert microphone audio data z(n) from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) in the frequency-domain. As used herein, a variable Z(n, k) corresponds to the frequency-domain signal and identifies an individual frame associated with frame index n and tone index k. Thus, the microphone audio data z(t) corresponds to time indexes, whereas the microphone audio data z(n) and the microphone audio data Z(n, k) corresponds to frame indexes.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin). To illustrate an example, the system 100 may apply FFT processing to the time-domain microphone audio data z(n), producing the frequency-domain microphone audio data Z(n, k), where the tone index "k" (e.g., frequency index) ranges from 0 to K and "n" is a frame index ranging from 0 to N. The history of the values across iterations is provided by the frame index "n", which ranges from 1 to N and represents a series of samples over time.

In some examples, the system 100 may perform a K-point FFT on a time-domain signal. For example, if a 256-point FFT is performed on a 16 kHz time-domain signal, the output is 256 complex numbers (e.g., complex amplitude data), where each complex number corresponds to a value at a frequency in increments of 16 kHz/256, such that there is 125 Hz between points, with point 0 corresponding to 0 Hz and point 255 corresponding to 16 kHz. Thus, each tone index in the 256-point FFT corresponds to a frequency range (e.g., subband) in the 16 kHz time-domain signal. While the example described above illustrates an example in which the overall frequency range is divided into 256 different frequency ranges (e.g., tone indexes), the disclosure is not limited thereto and the system 100 may divide the overall frequency range into K different frequency ranges (e.g., K indicates an FFT size) without departing from the disclosure.

Additionally or alternatively, while the system 100 may convert to the frequency-domain using a Fast Fourier Transform (FFT), the disclosure is not limited thereto. Instead, the tone index may be generated using Short-Time Fourier Transform (STFT), generalized Discrete Fourier Transform (DFT) and/or other transforms known to one of skill in the art (e.g., discrete cosine transform, non-uniform filter bank, etc.).

FIG. 2 illustrates an example of enabling dynamic ambiance according to embodiments of the present disclosure. As described above, the first device 110a may include an embedded hub component (e.g., Smarthome hub) that enables the first device 110a to directly communicate with one or more smart devices (e.g., endpoints) in proximity to the first device 110a. For example, the first device 110a may generate a dynamic ambiance 200 by sending commands to one or more smart devices during audio playback.

In the example illustrated in FIG. 2, the first device 110a may use the embedded hub component to directly communicate with a first bulb 112a, a second bulb 112b, and/or a first plug 114a. In some examples, the first device 110a may use the embedded hub component to directly communicate with a second device 110b without departing from the disclosure. However, the disclosure is not limited thereto and the first device 110a may communicate with any number of bulbs 112, plugs 114, and/or other smart devices without departing from the disclosure. In the example illustrated in FIG. 2, the first plug 114a is configured to control power to a fan 210, which may enable the system 100 to generate a wind effect by selectively providing power to the fan 210. However, the disclosure is not limited thereto and the plugs 114 may be configured to control a variety of output devices and/or enable a variety of special effects without departing from the disclosure.

In some examples, the first device 110a may communicate with smart devices using short-range wireless communications, which may have a range of up to 10-20 meters, although the disclosure is not limited thereto. Thus, the first device 110a may communicate with smart devices located within a building and/or a room in which the first device 110a is located. However, while the first device 110a may only directly communicate with smart devices that are in close proximity to the first device 110a (e.g., within 10-20 meters), in some examples the first device 110a may send commands to additional smart devices that are located at a greater distance from the first device 110a without departing from the disclosure. For example, the first device 110a may send commands to the distant smart devices by using one or more smart devices in proximity to the first device 110a as a router/relay, although the disclosure is not limited thereto.

As used herein, the first device 110a may communicate with smart devices using a computer network such as a Personal Area Network (PAN). For example, a PAN is a computer network for interconnecting electronic devices within a limited area, providing data transmission among a variety of smart devices, which may include one or more device(s) 110, smart bulb(s) 112, smart plug(s) 114, computer(s), smartphone(s), tablet(s), and/or the like without departing from the disclosure. In some examples, the first device 110a may communicate with smart devices wirelessly via a wireless personal area network (WPAN), which is a PAN carried over a low-powered, short-distance wireless network technology (e.g., Zigbee).

Zigbee is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network. Additionally or alternatively, IEEE 802.15.4 is a technical standard which defines the operation of a low-rate wireless personal area network (LR-WPAN).

As used herein, referring to sending data using WPAN protocols indicates that the data is sent to another device via a WPAN and/or using Zigbee-based technology. Using Zigbee-based terminology, the embedded hub component may be considered a Zigbee Coordinator (ZC), a device configured to route Zigbee data to another device may be considered a Zigbee router (ZR), and a smart device may be considered a Zigbee End Device (ZED). However, these descriptors are included as an illustrative example and the disclosure is not limited thereto.

A WPAN associated with the first device 110a may be very short range, such as within about 10 meters, and within a close proximity WPAN-equipped devices may communicate with each other as though they are connected through a cable instead of via a wireless connection. Unlike a Wireless Local Area Network (WLAN), which has a requirement of infrastructure setup, a WPAN connection involves little or no infrastructure. As a result, a latency associated with sending data via the WPAN may be reduced relative to sending data via the WLAN. For example, the first device 110a may send lighting data to an output device via the WPAN with low latency (e.g., 16 ms or less), whereas sending the same data via the WLAN may result in high latency (e.g., 100-300 ms).

FIG. 3A illustrates an external hub example 300 that results in high latency. As illustrated in FIG. 3A, a smartphone 310 may send first data to a wireless access point (WAP) via a first communication path (e.g., "1") and the WAP 320 may send the first data to an external hub device 20 via a second communication path (e.g., "2"). Upon receiving the first data, the external hub device 20 may send a first portion of the first data to a bulb 112 via a third communication path (e.g., "3") and may send a second portion of the first data to a plug 114 via a fourth communication path (e.g., "4"). As the smartphone 310 connects to the external hub device 20 via a WLAN associated with the WAP 320, there is a noticeable delay between the smartphone 310 sending the first data and the bulb 112/plug 114 receiving the first data.

Figure 3B:
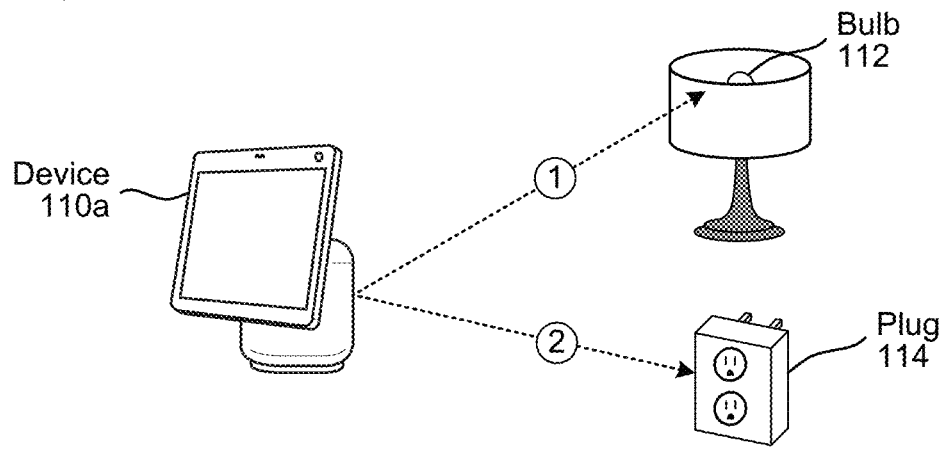
FIG. 3B illustrates an embedded smart hub example that enables low latency according to embodiments of the present disclosure.

FIG. 3B illustrates an embedded smart hub example that enables low latency according to embodiments of the present disclosure. As illustrated in FIG. 3B, in an embedded smart hub example 350 a first device 110a includes the embedded smart hub component and is therefore configured to send the first portion of the first data directly to the bulb 112 via a first communication path (e.g., "1") and send the second portion of the first data directly to the plug 114 via a second communication path (e.g., "2"). As the first device 110a connects to the bulb 112/plug 114 via the WPAN, there is low latency between the first device 110a sending the first data and the bulb 112/plug 114 receiving the first data.

In addition to reducing latency by communicating directly via a WPAN, in some examples the system 100 may reduce latency even further using a hardware abstraction layer (HAL). A HAL is a logical division of code that serves as an abstraction layer between a computer's physical hardware and the computer's software, providing a device driver interface that allows a program to communicate with the hardware. For example, a HAL may provide a uniform and consistent interface for applications to interact with hardware peripherals by concealing different hardware architectures.

To illustrate an example, an audio processor of the device 110 may send data to another component using low level HAL layers in order to communicate with low latency. For example, an audio processor HAL may send data to the smart hub component HAL using interprocess communication (IPC), such as LIPC, AIPC, and/or the like, without departing from the disclosure. The IPC refers to mechanisms that an operating system of the device 110 provides to allow the processes to manage shared data. For example, applications can use IPC, categorized as clients and servers, where the client requests data and the server responds to client requests. Being able to seamlessly send lighting data (e.g., intensity and color updates) from the audio processor HAL to the smart hub component HAL may result in up to a 16 ms latency from the time that a beat is played on a loudspeaker to the time that a visual update is pushed to the smart bulbs 112a-112b.

As will be described in greater detail below with regard to at least FIG. 8, the lighting data may correspond to pixel intensity values that control a brightness and/or color of an individual output pixel. For example, the lighting data may include Hue/Saturation/Level (HSL) values, which may indicate a hue value corresponding to a first color, a saturation value indicating an amount of saturation associated with the first color, and a level value indicating an amount of brightness associated with the first color. In some examples, the hue value may represent the first color using a first range of values (e.g., 0-360), while the saturation value may represent the amount of saturation (e.g., amount of gray) and the level value may represent the amount of brightness (e.g., from black to white) using a second range of values (e.g., 0-100). However, the disclosure is not limited thereto, and in other examples the hue value may represent the first color, the saturation value may represent the amount of saturation, and/or the level value may represent the amount of brightness using a third range of values (e.g., 0-254) without departing from the disclosure.

Thus, the lighting data may include a set of HSL values for each individual output pixel, and an output pixel may correspond to a light output device, such as an LED component, a group of LED components, other output devices, and/or the like without departing from the disclosure. For example, if an individual output device includes a plurality of LED components, the system 100 may divide the plurality of LED components into three groups of LED components, associate the output device with three output pixels, and may control the three groups with three separate sets of HSL values, although the disclosure is not limited thereto.

Figure 4A:
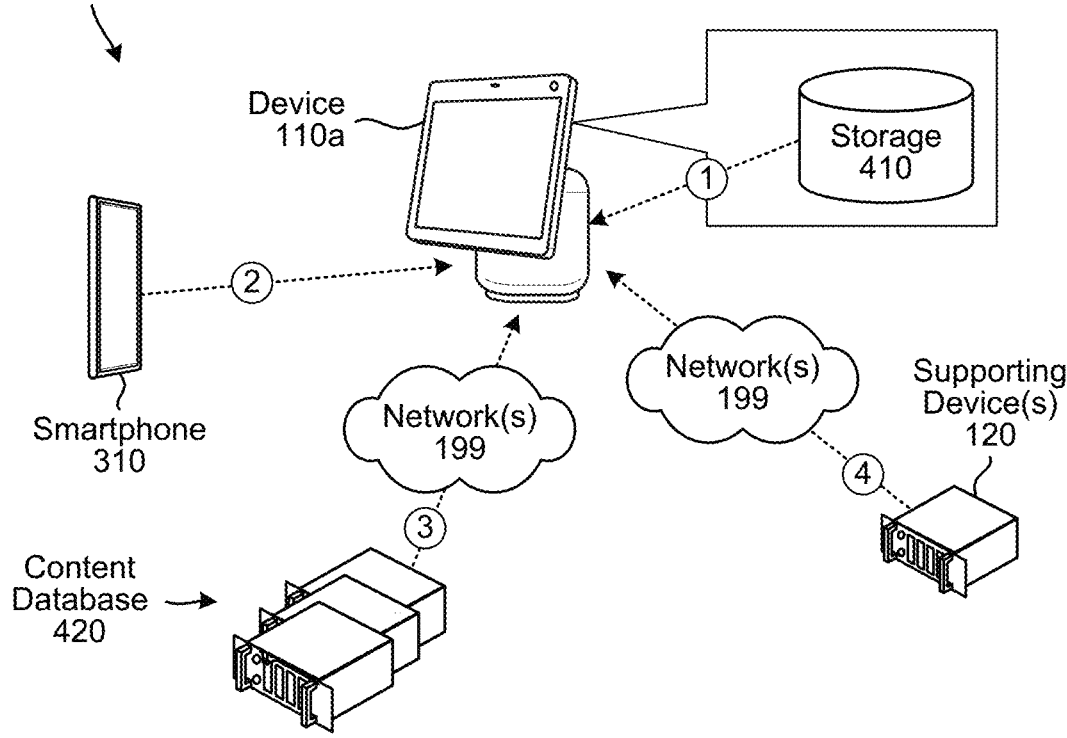
FIGS. 4A-4B illustrate examples of audio sources and generating special effects according to embodiments of the present disclosure.
Figure 4B:
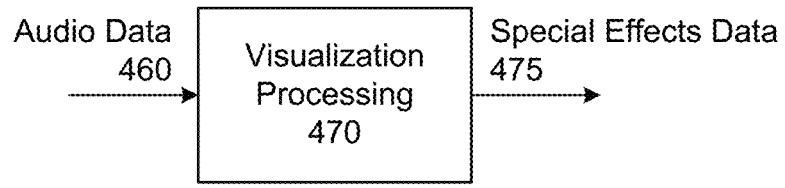

FIGS. 4A-4B illustrate examples of audio sources and generating special effects according to embodiments of the present disclosure. As illustrated in FIG. 4A, the first device 110a may receive audio data from various sources without departing from the disclosure. For example, the first device 110a may generate the dynamic ambiance and/or enable special effects for any audio data, regardless of whether the audio data is stored locally on the first device 110a, received from a device in proximity to the first device 110a, streamed from a content database via extended networks, and/or the like.

In a first example, the first device 110a may store the audio data on a storage component 410 associated with the first device 110a. In some examples, the storage component 410 may be internal to the first device 110a, such as an internal hard drive component and/or the like. However, the disclosure is not limited thereto, and in other examples the storage component 410 may be an external hard drive, network storage, and/or the like without departing from the disclosure. During audio playback, the first device 110a may retrieve the audio data from the storage component 410 using a first communication path (e.g., "1"), as illustrated in audio source examples 400 depicted in FIG. 4A.

In a second example, the first device 110a may receive the audio data from a smartphone 310 and/or other playback device (e.g., tablet, computer, music player, etc.). In some examples, the smartphone 310 may stream the audio data from a content database using a music application, a streaming service, a subscription service, and/or the like. For example, a user of the smartphone 310 may select music or other audio content (e.g., audiobook, podcast, radio show, etc.) from a catalog of content associated with a content provider, and the smartphone 310 may receive audio data corresponding to the selected audio content from a content database associated with the content provider. However, the disclosure is not limited thereto and in other examples the smartphone 310 may store the audio data internally without departing from the disclosure. During audio playback, the first device 110a may receive the audio data from the smartphone 310 using a second communication path (e.g., "2"), as illustrated in the audio source examples 400 depicted in FIG. 4A. For example, the second communication path may correspond to a wireless connection between the smartphone 310 and the first device 110a, such a Bluetooth connection, although the disclosure is not limited thereto.

While FIG. 4A illustrates an example of the second communication path corresponding to a wireless connection, the disclosure is not limited thereto and the second communication path may correspond to a wired connection without departing from the disclosure. In some examples, the first device 110a may receive the audio data from the smartphone 310 and/or other playback device via a first wired connection, such as a Universal Serial Bus (USB) port, although the disclosure is not limited thereto. In other examples, the first device 110a may receive the audio data from the smartphone 310 and/or other playback device via a second wired connection, such as an audio port (e.g., line-in jack). Thus, the playback device may correspond to audio equipment (e.g., compact disc (CD) player, record player, karaoke machine, etc.) without departing from the disclosure. Additionally or alternatively, in some examples the first device 110a may receive first audio data representing playback audio (e.g., music) and second audio data representing microphone audio (e.g., speech or vocals) at the same time. For example, a karaoke machine may send first audio data including a representation of music (e.g., instrumentals or backup singers) along with second audio data including a representation of the user singing along with the music. However, the disclosure is not limited thereto, and in other examples the first device 110a may receive combined audio data (e.g., premixed audio) representing the playback audio and the microphone audio without departing from the disclosure.

In a third example, the first device 110a may receive the audio data from a content database 420 associated with a content provider. For example, a user profile of the first device 110a may be associated with account information for one or more content providers, enabling the first device 110a to access audio content included in content catalog(s) associated with the content provider(s). To illustrate an example, the user profile may be associated with an account and/or subscription plan for a first content provider, enabling the first device 110a to stream music or other audio content (e.g., audiobook, podcast, radio show, etc.) from a first content database 420a associated with the first content provider. During audio playback, the first device 110a may receive the audio data from the content database 420 using a third communication path (e.g., "3"), as illustrated in the audio source examples 400 depicted in FIG. 4A. For example, the third communication path may connect the first device 110a and the content database 420 across one or more networks 199 (e.g., extended network(s)) without departing from the disclosure.

Similarly, in a fourth example the first device 110a may receive the audio data from supporting device(s) 120 via the network(s) 199. During audio playback, the first device 110a may receive the audio data from the supporting device(s) 120 using a fourth communication path (e.g., "4"), as illustrated in the audio source examples 400 depicted in FIG. 4A. While FIG. 4A illustrates several audio source example 400, the disclosure is not limited thereto and the first device 110a may receive the audio data from a variety of audio sources without departing from the disclosure.

As described above with regard to FIG. 1A, the device 110 may be configured to generate special effects that augment audio playback. For example, the device 110 may process audio data and generate special effects that are synchronized with the audio playback, enabling a dynamic ambiance that varies based on the content and is timed in coordination with the audio playback. In some examples, the special effects may correspond to visual effects. For example, the system 100 may control a color and/or intensity of a plurality of lights (e.g., smart bulbs 112, light-emitting diode (LED) components associated with a device 110, and/or the like) without departing from the disclosure. However, the disclosure is not limited thereto and the special effects may correspond to physical effects, sound effects, and/or other effects depending on functionality available to the system 100. For example, the system 100 may control whether power is provided to various output devices using one or more smart plugs 114, enabling the system 100 to generate additional effects corresponding to the individual output device.

To illustrate a first example, during music playback the system 100 may generate special effects that mimic professional entertainment equipment used in professional venues (e.g., during a music concert, in a nightclub, etc.), such as disco lights, strobe lights, spotlights, projectors, fog machines, and/or the like. To illustrate a second example, during audiobook playback the system 100 may create an immersive experience by generating special effects that correspond to content of the audiobook without departing from the disclosure. For example, the system 100 may generate special effects that physically manifest descriptive elements represented in the audiobook, creating conditions associated with things (e.g., waterfall, forest, city, etc.), weather phenomena (e.g., wind, fog, lightning, etc.), and/or the like, although the disclosure is not limited thereto. For ease of illustration, these physical special effects are described with regard to audiobook content, but the disclosure is not limited thereto and the system 100 may create an immersive experience using physical special effects for other content (e.g., movies, television shows, etc.) without departing from the disclosure.

To illustrate examples of the system 100 creating the immersive experience, the system 100 may control whether power is provided to various output devices using the smart plugs 114, enabling the system 100 to generate physical special effects corresponding to the individual output device. While these special effects may vary without departing from the disclosure, examples include controlling a directional light to generate a spotlight effect, controlling fixed lighting (e.g., strobe lights, multicolored party lights, Christmas lights, blacklights, ultraviolet lights, and/or the like) to generate a visual effect, controlling a fan to generate a wind effect, controlling a fog/smoke machine to generate a fog/smoke effect, controlling a humidifier to generate a mist effect, controlling a water fountain to generate a water effect, controlling a bubble machine to generate a bubble effect, and/or the like, although the disclosure is not limited thereto.

With regard to the visual effects, in some examples the system 100 may group all of the lights together and control a color and/or intensity for the entire group based on the audio playback in order to create a uniform visualization. For example, every light in the room may generate the same color, with the intensity of the color varying based on the audio content. In other examples, the system 100 may separate the lights into multiple groups and control a color and/or intensity for each individual group separately based on the audio content. For example, multiple groups of lights may generate the same color, with the intensity of the color varying between the groups, although the disclosure is not limited thereto and multiple groups of lights may generate different colors/intensities without departing from the disclosure. To illustrate an example, one or more first light output devices may generate a first visual effect using first lighting data generated using a first frequency range of the audio data, one or more second light output devices may generate a second visual effect using second lighting data generated using a second frequency range of the audio data, and so on. Thus, in some examples the groups of light output devices may represent spectral content of the audio content, creating a visual effect reminiscent of an equalizer, although the disclosure is not limited thereto.

In some examples, the device 110 may perform special effects generation 450 by processing the audio data locally on the device 110. As illustrated in FIG. 4B, a visualization processing component 470 may receive audio data 460 and may process the audio data 460 to generate special effects data 475 corresponding to the special effects described above. For example, the device 110 may divide the audio data 460 into a plurality of frequency bands and may generate the special effects data 475 based on an energy content (e.g., energy represented in an individual frequency band), a tempo of the audio content (e.g., number of beats per minute), current audio channels (e.g., discrete audio channels in a surround sound system), a direction associated with an audible sound (e.g., directional audio signals in a surround sound system), and/or the like without departing from the disclosure.

In other examples, the device 110 may perform special effects generation 450 by decoding curated special effects that were embedded with the audio data. For example, a content creator or other entity may generate special effects data specifically for the audio data and may embed the special effects data within the audio data to generate encoded audio data. Thus, the device 110 may receive the encoded audio data and may decode the encoded audio data to determine the special effects data associated with the audio data. In some examples, the special effects data may be embedded in a least significant bit (LSB) of the audio data, although the disclosure is not limited thereto.

As illustrated in FIG. 4B, a special effects decoding component 490 may receive encoded audio data 480 and process the encoded audio data 480 to generate special effects data 495. For example, the encoded audio data 480 may embed the information represented by the special effects data 495 in a least significant bit of audio content, although the disclosure is not limited thereto.

In some examples, the device 110 may generate the special effects data 475 based on the output devices connected to the device 110 and/or associated with the system 100. For example, the device 110 may determine a number of lights connected to the device 110 and divide the audio data into a number of frequency bands to match the number of lights, although the disclosure is not limited thereto. Similarly, the device 110 may generate the special effects data 495 based on the output devices connected to the device 110 and/or associated with the system 100. For example, the special effects decoding component 490 may decode the special effects generated by the content creator and may assign these special effects to the output devices connected to the device 110. Thus, first special effects data 495a generated by a first device 110a may be different from second special effects data 495b generated by a second device 110b without departing from the disclosure. However, the disclosure is not limited thereto, and in other examples the special effects data 495 may be universal to all devices 110 and the device 110 may perform additional processing to the special effects data 495 to generate special effects data that is specific to the device 110. For example, the device 110 may assign visual effects to lights included in the output devices, may determine what types of output devices are connected to the device 110 and assign physical special effects to a corresponding output device, and/or the like without departing from the disclosure.

Figure 5A:
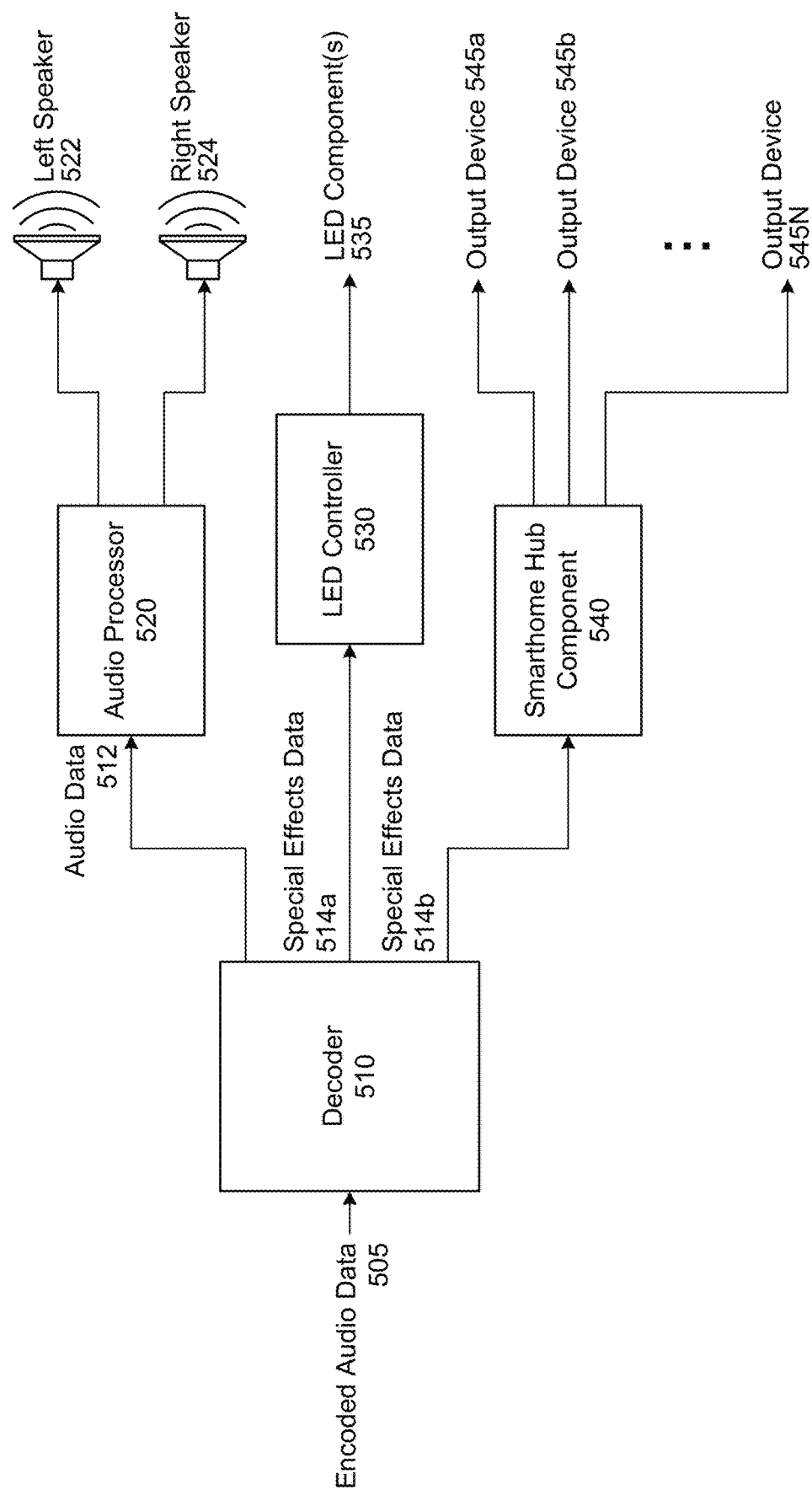
FIGS. 5A-5B illustrate examples of routing commands according to embodiments of the present disclosure.
Figure 5B:
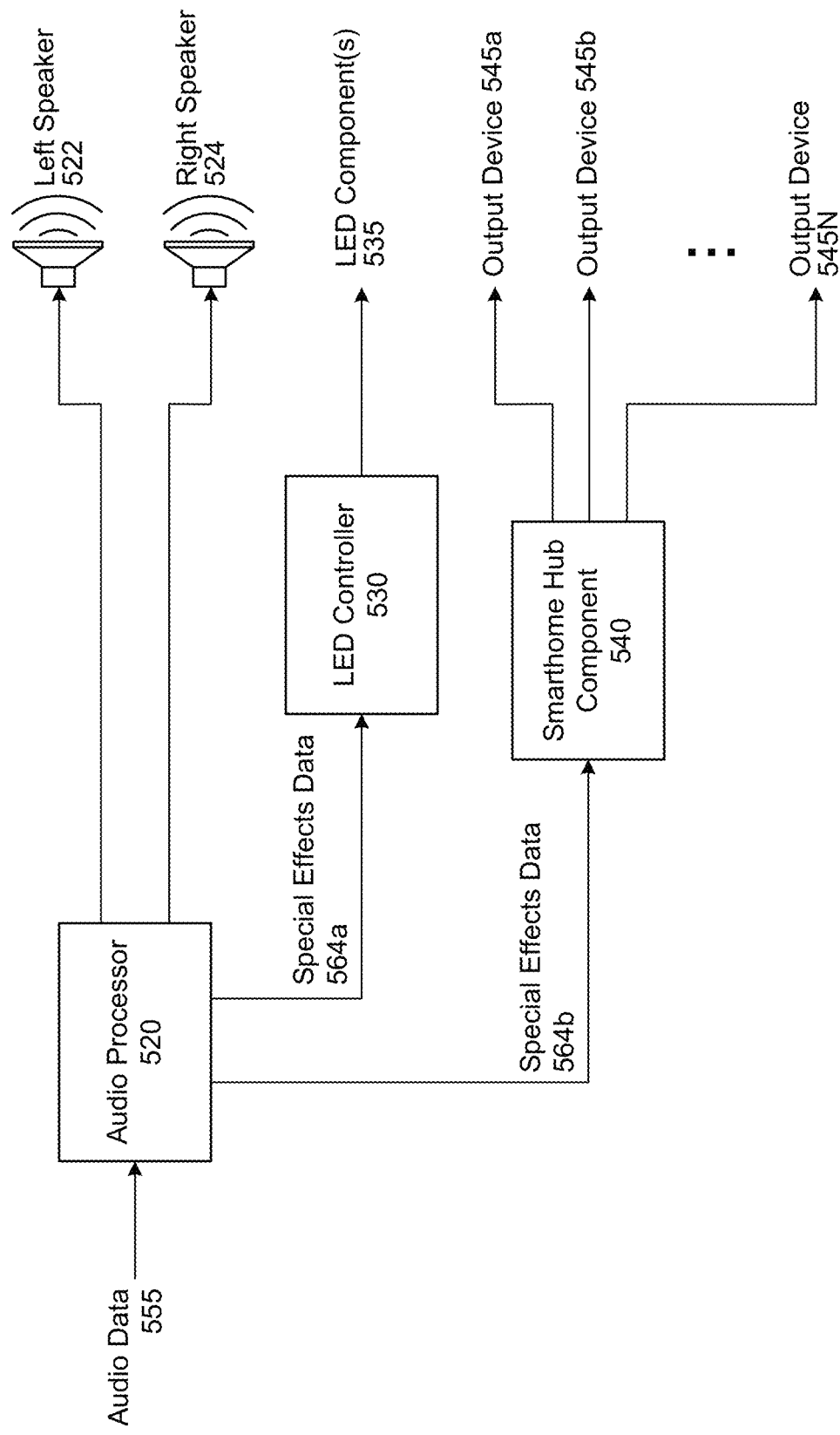

FIGS. 5A-5B illustrate examples of routing commands according to embodiments of the present disclosure. In some examples, the device 110 may receive encoded audio data and may perform special effects decoding to extract the special effects data, as illustrated in FIG. 5A. In these examples, the device 110 may perform command routing 500 to send audio data to loudspeakers and send commands to output devices. In other examples, the device 110 may receive audio data (e.g., un-encoded audio data) and may perform visualization processing to generate the special effects data, as illustrated in FIG. 5B. In these examples, the device 110 may perform command routing 550 to send audio data to the loudspeakers and send commands to the output devices. However, the disclosure is not limited thereto and the device 110 may route commands to the output devices in a variety of ways without departing from the disclosure.

As illustrated in FIG. 5A, in some examples the device 110 may receive encoded audio data 505 and may process the encoded audio data 505 using a decoder component 510. For example, the decoder component 510 may process the encoded audio data 505 to generate audio data 512 and special effects data 514. Thus, the device 110 may perform command routing 500 by sending the audio data 512 to an audio processor 520 (e.g., audio signal processor) and by sending the special effects data 514 to an LED controller component 530 and/or a smarthome hub component 540.

In the example illustrated in FIG. 5A, the device 110 may include two internal loudspeakers (e.g., stereo output) and the audio processor 520 may generate playback audio data for a left speaker 522 and a right speaker 524. To illustrate an example, the audio processor 520 may process the audio data 512 to generate first playback audio data for the left speaker 522 and second playback audio data for the right speaker 524. However, the disclosure is not limited thereto, and in other examples the audio processor 520 may generate playback audio data for three or more loudspeakers without departing from the disclosure. For example, the device 110 may include three or more internal loudspeakers and the audio processor 520 may process the audio data 512 to generate playback audio data for each of the three or more loudspeakers without departing from the disclosure. Additionally or alternatively, the device 110 may be associated with one or more external loudspeakers and the audio processor 520 may generate playback audio data for the one or more external loudspeakers in addition to and/or instead of the internal loudspeakers without departing from the disclosure.

As the decoder component 510 extracts the special effects data 514 from the encoded audio data 505, in this example the audio processor 520 is not used to generate the special effects data 514 from the audio data 512. Instead, the decoder component 510 may send the special effects data 514 to one or more output devices via an LED controller component 530, a smarthome hub component 540, and/or the like without departing from the disclosure. For example, the decoder component 510 may send first special effects data 514a to the LED controller component 530, which may use the first special effects data 514a to create visual effects using one or more LED component(s) 535. Additionally or alternatively, the decoder component 510 may send second special effects data 514b to the smarthome hub component 540 and the smarthome hub component 540 may create special effects (e.g., visual effects, physical effects, and/or the like) using one or more output devices 545.

In some examples, the device 110 may either send the first special effects data 514a to the LED controller component 530 or send the second special effects data 514b to the smarthome hub component 540, but not both. For example, if the device 110 is not connected to any of the output devices 545, the device 110 may generate the first special effects data 514a based on the LED component(s) 535 connected to the device 110 and may send the first special effects data 514a to the LED controller component 530 to generate visual effects using the LED component(s) 535. However, if the device 110 is connected to any of the output devices 545, or specifically if the device 110 is connected to smart bulbs 112, the device 110 may generate the second special effects data 514b based on the output devices 545 and may send the second special effects data 514b to the smarthome hub component 540 to generate visual effects, physical effects, and/or additional special effects using the output devices 545 connected to the device 110 via the smarthome hub component 540.

The disclosure is not limited thereto, however, and in some examples the device 110 may send the first special effects data 514a to the LED controller component 530 while also sending the second special effects data 514b to the smarthome hub component 540 without departing from the disclosure. For example, the device 110 may generate visual effects using a combination of the LED component(s) 535 associated with the device 110 and the output devices 545 connected to the device 110 without departing from the disclosure. In some examples, the device 110 may generate the special effects data 514 by treating the LED component(s) 535 and the output devices 545 (e.g., smart bulbs 112) as interchangeable endpoints. For example, the device 110 may generate a first number of visual effects corresponding to a total number of LED component(s) 535 and output devices 545, such that each LED component(s) 535 or output device 545 may generate one of the first number of visual effects. However, the disclosure is not limited thereto and in other examples the device 110 may generate first visual effects using the output devices 545 and one or more second visual effects using the LED component(s) 535. For example, the device 110 may generate a first number of visual effects corresponding to a total number of output devices 545, such that each output device 545 may generate one of the first number of visual effects, with the LED component(s) 535 separately generating the one or more second visual effects.

As illustrated in FIG. 5B, in some examples the device 110 may generate special effects data instead of decoding special effects data embedded in the received audio data. For example, the device 110 may receive audio data 555 (e.g., un-encoded audio data that is not embedded with special effects data) and the audio processor 520 may process the audio data 555 to generate special effects data 564, although the disclosure is not limited thereto. Thus, the device 110 may perform command routing 550 by sending the special effects data 564 to the LED controller component 530, the smarthome hub component 540, and/or the like without departing from the disclosure. For example, the audio processor 520 may send first special effects data 564a to the LED controller component 530, which may use the first special effects data 564a to create visual effects using one or more LED component(s) 535, as described in greater detail above with regard to FIG. 5A. Additionally or alternatively, the audio processor 520 may send second special effects data 564b to the smarthome hub component 540 and the smarthome hub component 540 may create special effects (e.g., visual effects, physical effects, and/or the like) using one or more output devices 545, as described in greater detail above with regard to FIG. 5A.

While the example illustrated in FIG. 5A illustrates the decoder component 510 as being separate from the audio processor 520, the disclosure is not limited thereto. In some examples, the audio processor 520 may include the decoder component 510, such that the audio processor 520 may receive the encoded audio data 505 and generate the special effects data 514 without departing from the disclosure.

While FIG. 5A illustrates an example of the device 110 sending the first special effects data 514a to the LED controller component 530 and/or the second special effects data 514b to the smarthome hub component 540, the disclosure is not limited thereto. In some examples, the device 110 may send third special effects data 514c to one or more devices in proximity to the device 110 via a WLAN associated with the WAP 320 without departing from the disclosure. For example, a first device 110a may send the third special effects data 514c to a second device 110b via the WLAN in order to enable the second device 110b to generate visual effects and/or other special effects in synchronization with the first device 110a and/or in coordination with the output audio. Additionally or alternatively, the first device 110a may send the third special effects data 514 to a smart bulb 112, smart plug 114, and/or other output device to enable these output devices to generate special effects during audio playback without departing from the disclosure.

To illustrate an example, the first device 110a may receive the encoded audio data 505 and generate the audio data 512 and the special effects data 514, as described above with regard to FIG. 5A. In some examples, such as when the first device 110a is only sending the special effects data 514 to low latency output devices (e.g., LED component(s) 535 and/or output devices 545), the first device 110a may only generate the first special effects data 514a and/or the second special effects data 514b. Thus, the first device 110a may be configured to decode the encoded audio data 505 in smaller batches during playback, such as decoding a first number of audio frames at a time. The first device 110a may store the audio data 512 and/or the special effects data 514a/514b in a first buffer having a first size corresponding to the first number of audio frames. After a first time delay, the first device 110a may send the audio data 512 and/or the special effects data 514a/514b to the loudspeakers 522/524, the LED component(s) 535, and/or the output devices 545.

In other examples, such as when the first device 110a is sending the third special effects data 514c to output devices via the WLAN or other higher latency communication paths, the first device 110a may generate the first special effects data 514a, the second special effects data 514b, and/or the third special effects data 514c. For example, the first device 110a may be configured to decode the encoded audio data 505 in larger batches during playback, such as a second number of audio frames at a time. The first device 110a may store the audio data 512 and/or the special effects data 514a/514b/514c in a second buffer having a second size corresponding to the second number of audio frames. After a second time delay, the first device 110a may send the third special effects data 514c to the output devices via the WLAN, leaving enough time for the output devices to receive the third special effects data 514c and synchronize the special effects with the output audio. After a third time delay, the first device 110a may send the audio data 512 and/or the special effects data 514a/514b to the loudspeakers 522/524, the LED component(s) 535, and/or the output devices 545. Thus, the system 100 may coordinate the special effects even taking into account the variable delays and/or higher latency associated with the WLAN.

As described above with regard to FIG. 1B, the device 110 may generate additional special effects using keyword detection. For example, the device 110 may detect keywords represented in audio data and may perform one or more actions responsive to the keyword detected. To illustrate a first example, the device 110 may detect a first keyword (e.g., "forest") and generate a visual effect corresponding to the first keyword (e.g., set a color of the output devices 545 to green). To illustrate a second example, the device 110 may detect a second keyword (e.g., "wind") and generate a physical effect corresponding to the second keyword (e.g., send a command to a smart plug 114 to provide power to a table fan). However, the disclosure is not limited thereto and the device 110 may generate a variety of visual effects, physical effects, and/or the like in response to a single keyword without departing from the disclosure.

In some examples, the system 100 may perform keyword detection locally on the device 110, such that the device 110 processes the playback audio data and/or the microphone audio data to detect keywords and perform special effects. However, the disclosure is not limited thereto, and in other examples the system 100 may perform keyword detection remotely using the supporting device(s) 120, the content database 420, and/or other devices without departing from the disclosure. For example, the supporting device(s) 120 may process the playback audio data and perform keyword detection prior to sending the playback audio data to the device 110. Thus, the device 110 may receive the playback audio data embedded with special effects associated with keyword detection. Additionally or alternatively, the device 110 may receive the playback audio data and first data that indicates one or more keywords represented in the playback audio data. For example, the first data may indicate the necessary timing involved to enable the device 110 to perform the special effects in coordination with the one or more keywords represented in the playback audio data.

Figure 6:
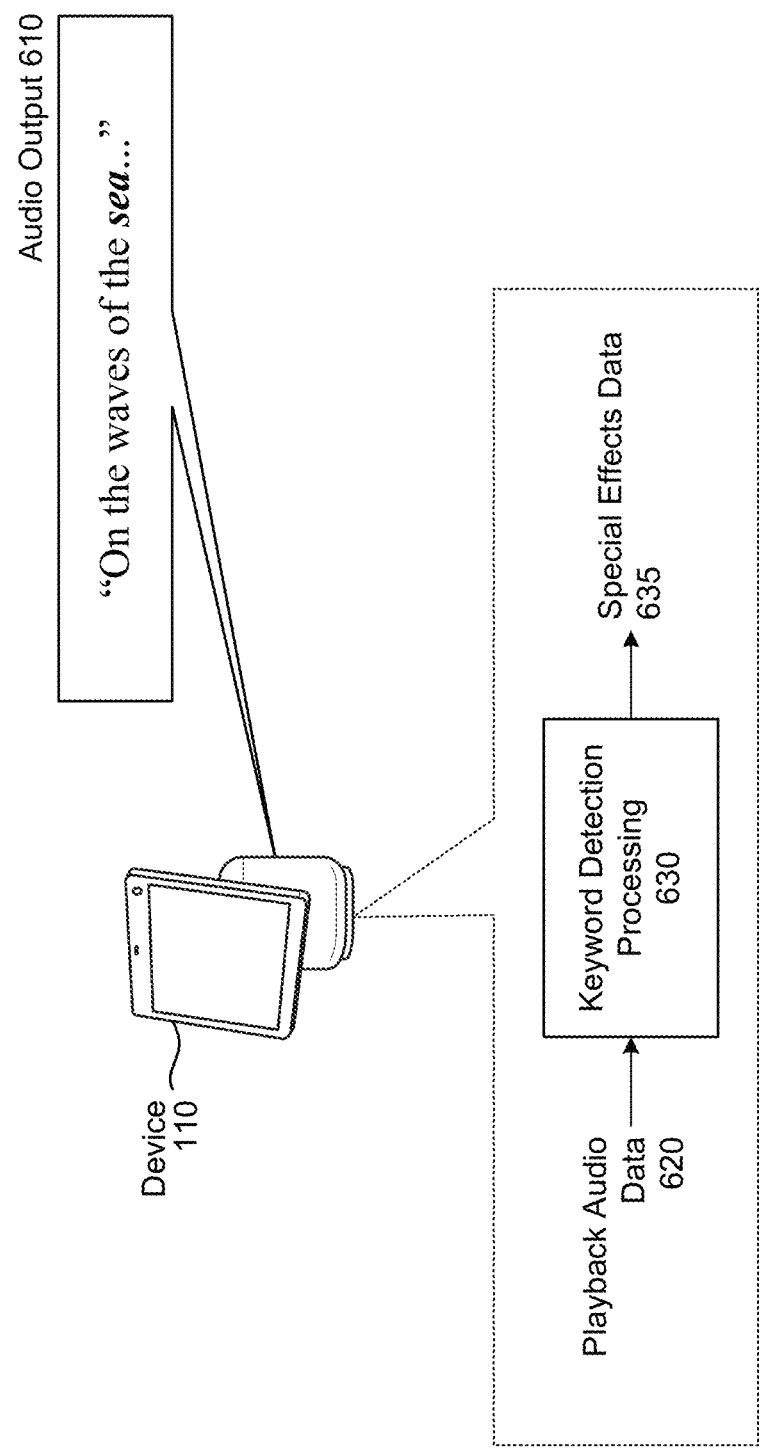
FIG. 6 illustrates an example of a listening enhancement mode according to embodiments of the present disclosure.

FIG. 6 illustrates an example of a listening enhancement mode according to embodiments of the present disclosure. During listening enhancement mode 600, the device 110 may perform keyword detection as part of outputting audio content. For example, the device 110 may receive playback audio data corresponding to an audiobook or other media content and the device 110 may use the playback audio data to generate audio output. While generating the audio output, the device 110 may perform keyword detection to detect whether a preconfigured keyword is represented in the playback audio data. If a keyword is detected, the device 110 may determine one or more actions associated with the detected keyword and may generate special effects data corresponding to the one or more actions.

In the example illustrated in FIG. 6, the device 110 may generate audio output 610 (e.g., "On the waves of the sea . . . ") using playback audio data 620. In addition, the device 110 may process the playback audio data 620 using a keyword detection processing component 630 to generate special effects data 635. For example, the keyword detection processing component 630 may detect that a first keyword (e.g., "sea") is represented in the playback audio data 620 and may generate the special effects data 635 in order to create a visual effect (e.g., set a color of one or more output devices to blue). However, the disclosure is not limited thereto, and the special effects data 635 may create a variety of special effects without departing from the disclosure. In some examples, the special effects data 635 may create the visual effect described above, while also creating one or more physical effects by sending command(s) to smart plug(s) 114. For example, the device 110 may create the water effect by controlling a water fountain, may create the wind effect by controlling a table fan, and/or the like without departing from the disclosure.

Figure 7:
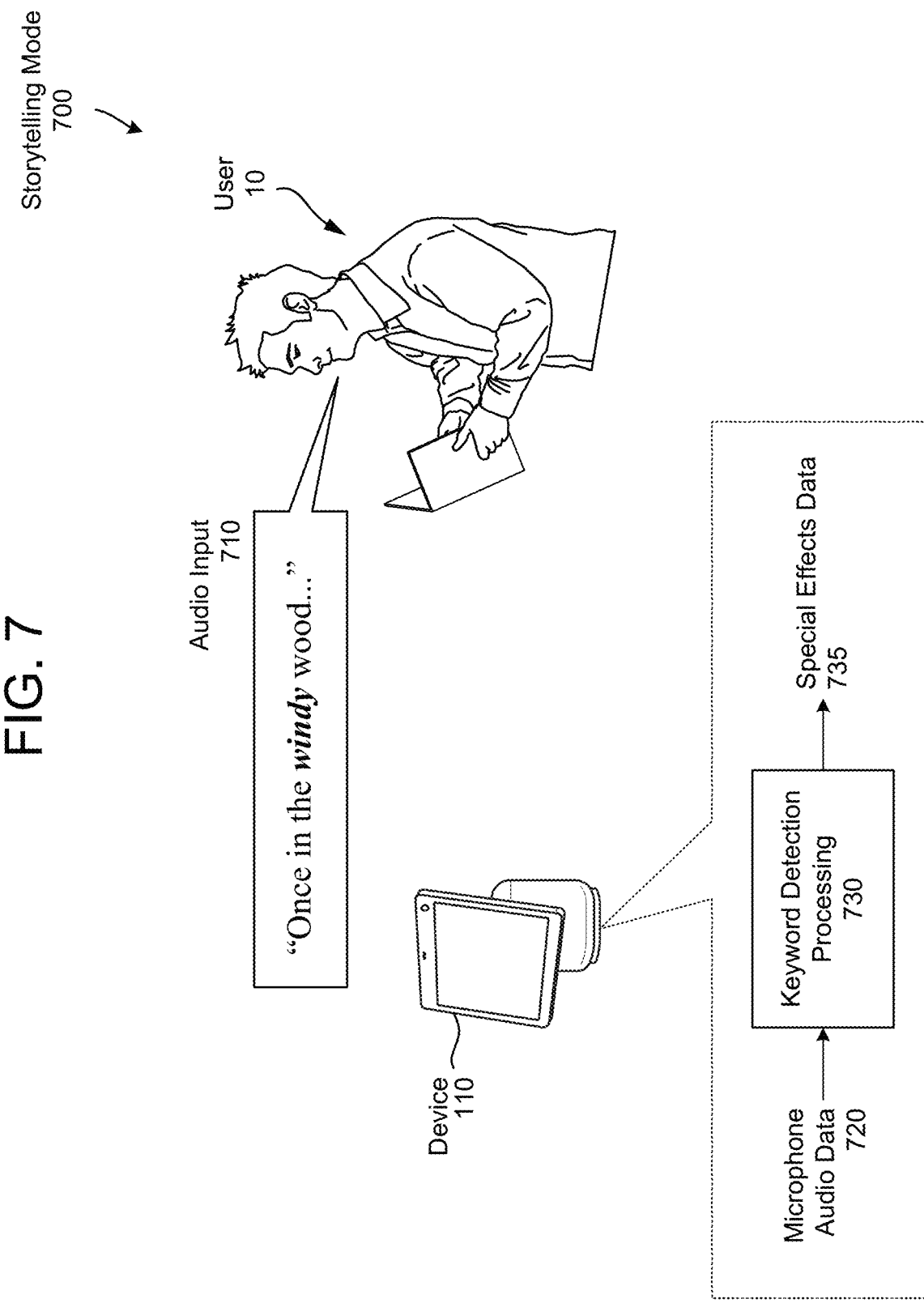
FIG. 7 illustrates an example of a storytelling mode according to embodiments of the present disclosure.

FIG. 7 illustrates an example of a storytelling mode according to embodiments of the present disclosure. During storytelling mode 700, the device 110 may perform keyword detection to provide special effects while the user reads a book (e.g., storybook, children's book, etc.). For example, as the user generates speech corresponding to the book, the device 110 may generate microphone audio data capturing this speech and may perform keyword detection to detect whether a preconfigured keyword is represented in the microphone audio data. If a keyword is detected, the device 110 may determine one or more actions associated with the detected keyword and may generate special effects data corresponding to the one or more actions.

In the example illustrated in FIG. 7, the device 110 may capture audio input 710 (e.g., "Once in the windy wood . . . ") and generate microphone audio data 720 representing the audio input 710. In addition, the device 110 may process the microphone audio data 720 using a keyword detection processing component 730 to generate special effects data 735. For example, the keyword detection processing component 730 may detect that a second keyword (e.g., "windy") is represented in the microphone audio data 720 and may generate the special effects data 735 in order to create a physical effect corresponding to the second keyword. For example, the device 110 may create a wind effect by controlling a table fan using a smart plug 114, although the disclosure is not limited thereto. However, the disclosure is not limited thereto, and the special effects data 735 may create any type of special effect and/or two or more special effects without departing from the disclosure.

Figure 8:
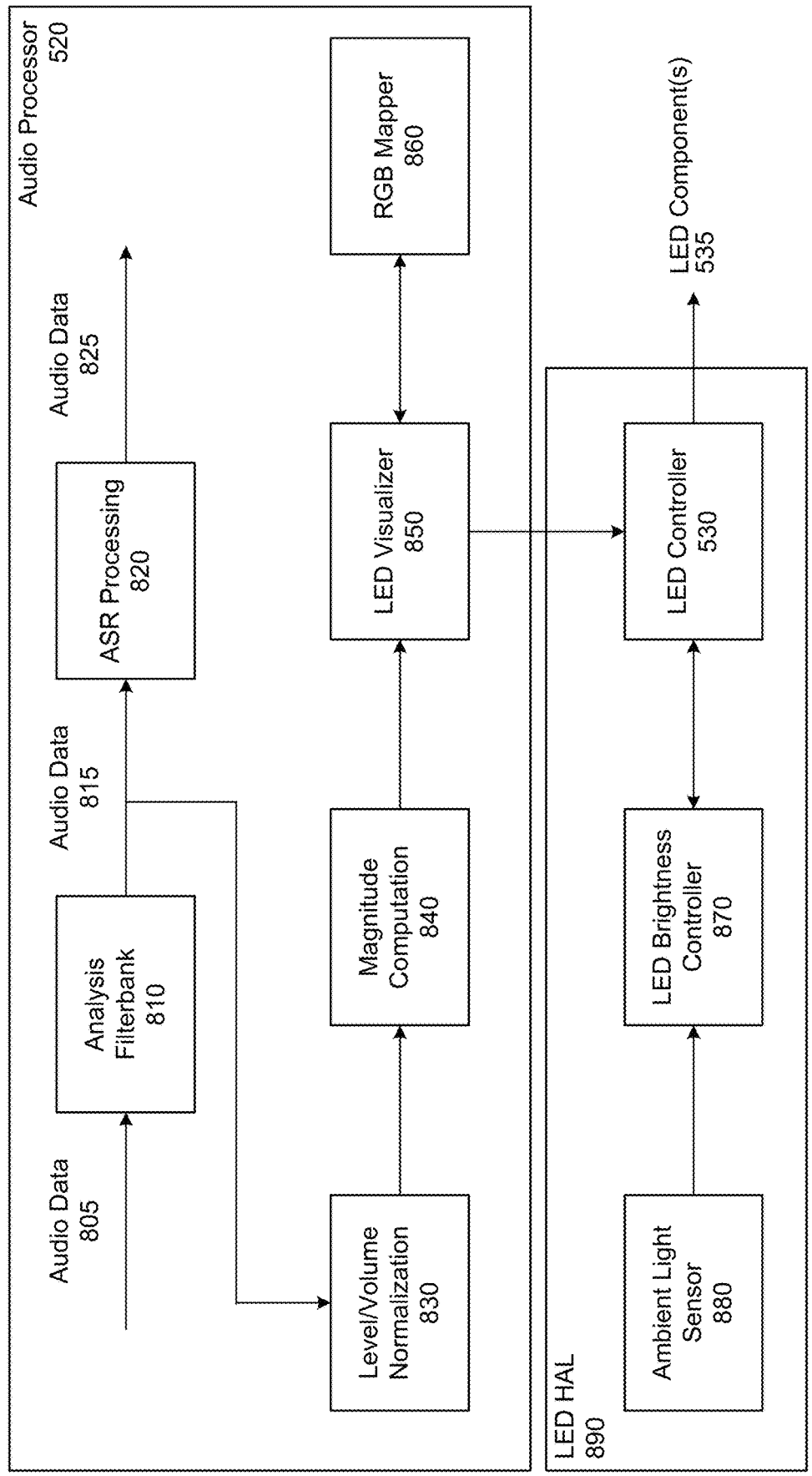
FIG. 8 illustrates an example component diagram for an audio signal processor configured to perform visualization processing according to embodiments of the present disclosure.

FIG. 8 illustrates an example component diagram for an audio signal processor configured to perform visualization processing according to embodiments of the present disclosure. As illustrated in FIG. 8, the audio processor 520 (e.g., audio signal processor) may include a variety of components configured to perform audio processing. For example, the audio processor 520 may include an analysis filterbank component 810 configured to receive first audio data 805 in a time domain and generate second audio data 815 in a frequency domain (or a subband domain), although the disclosure is not limited thereto. In addition, the audio processor 520 may include an automatic speech recognition (ASR) processing component 820 configured to process the second audio data 815 to generate third audio data 825 that may be sent to an additional component for ASR processing without departing from the disclosure.

As illustrated in FIG. 8, a level/volume normalization component 830 may process the second audio data 815 in the frequency domain and perform normalization and/or other processing to generate first data, which is sent to a magnitude computation component 840. For example, the level/volume normalization component 830 may track an amount of energy represented in an individual frequency band for a duration of time, enabling the level/volume normalization component 830 to determine a minimum value, a maximum value, and/or a dynamic range associated with the selected frequency band. However, the disclosure is not limited thereto, and in other examples the level/volume normalization component 830 may perform normalization to each individual frequency band without departing from the disclosure.

The magnitude computation component 840 may receive the first data from the level/volume normalization component 830 and may generate second data. For example, the magnitude computation component 840 may compare a current energy value to the minimum value and/or the maximum value and translate the current energy value to a brightness value (e.g., intensity value). The brightness value indicates an amount of brightness or intensity associated with a particular visual effect. To illustrate an example, if the system 100 includes five output devices and each output device is configured to generate a single visual effect, the brightness value may indicate an amount of brightness associated with an individual frequency band. However, the disclosure is not limited thereto, and in other examples each output device may be configured to generate multiple visual effects without departing from the disclosure. For example, an individual output device may include a plurality of light-emitting diodes (LEDs) and the system 100 may group the LEDs into three groups, such that the output device may be configured to generate three visual effects, although the disclosure is not limited thereto.

The magnitude computation component 840 may output the second data to an LED visualizer component 850, which may also receive third data from an RGB mapper component 860. For example, the RGB mapper component 860 may generate third data indicating a color (e.g., hue, saturation, and/or the like) and/or location (e.g., direction of an output device) associated with the playback audio. To illustrate an example, the RGB mapper component 860 may determine the color and/or location based on a number of beats per minute, which channel the audio is being played in (e.g., individual channel in a surround sound system), a direction associated with an audible sound, and/or the like, although the disclosure is not limited thereto. The RGB mapper component 860 may determine the beats per minute associated with the playback audio by determining a number of peaks represented in the playback audio across all frequency bands, although the disclosure is not limited thereto.

Based on the second data (e.g., brightness or intensity) received from the magnitude computation component 840 and the third data (e.g., color and/or location) received from the RGB mapper component 860, the LED visualizer component 850 may generate lighting data. As used herein, the lighting data may correspond to pixel intensity values that control a brightness and/or color of an individual output pixel. For example, the lighting data may include Hue/Saturation/Level (HSL) values, which may indicate a hue value corresponding to a first color, a saturation value indicating an amount of saturation associated with the first color, and a level value indicating an amount of brightness associated with the first color. In some examples, the hue value may represent the first color using a first range of values (e.g., 0-360), while the saturation value may represent the amount of saturation (e.g., amount of gray) and the level value may represent the amount of brightness (e.g., from black to white) using a second range of values (e.g., 0-100). However, the disclosure is not limited thereto, and in other examples the hue value may represent the first color, the saturation value may represent the amount of saturation, and/or the level value may represent the amount of brightness using a third range of values (e.g., 0-254) without departing from the disclosure.

Thus, the lighting data may include a set of HSL values for each individual output pixel, and an output pixel may correspond to alight output device, such as an LED component, a group of LED components, other output devices, and/or the like without departing from the disclosure. For example, if an individual output device includes a plurality of LED components, the system 100 may divide the plurality of LED components into three groups of LED components, associate the output device with three output pixels, and may control the three groups with three separate sets of HSL values, although the disclosure is not limited thereto. However, the disclosure is not limited thereto, and the lighting data may indicate a visual effect using other techniques without departing from the disclosure.

As illustrated in FIG. 8, the audio processor 520 may send the lighting data to an LED Hardware Abstract Layer (HAL) 890 corresponding to the LED component(s) 535. For example, the LED visualizer component 850 may send the lighting data to the LED controller component 530 and the LED controller component 530 may be configured to control the LED component(s) 535, as described in greater detail above with regard to FIG. 5B. Thus, the lighting data generated in FIG. 8 may correspond to special effects data 564a, although the disclosure is not limited thereto. In some examples, the audio processor 520 may send the lighting data to the LED HAL 890 using interprocess communication (IPC), such as LIPC, AIPC, and/or the like, without departing from the disclosure. The IPC refers to mechanisms that an operating system of the device 110 provides to allow the processes to manage shared data, and sending the lighting data using the IPC may reduce a latency associated with the visual effects.

In addition to receiving the lighting data from the LED visualizer component 850, the LED controller component 530 may also receive ambient lighting information from an ambient light sensor component 880 via an LED brightness controller component 870. For example, the ambient light sensor component 880 may detect an ambient light brightness and/or ambient color tones. In some examples, the LED brightness controller component 870 and/or the LED controller component 530 may modify the visual effects sent to the LED component(s) 535 based on the ambient lighting information without departing from the disclosure. For example, the device 110 may select colors that match the color tones represented in the environment, may select colors that compensate for the color tones represented in the environment, and/or the like, although the disclosure is not limited thereto. However, the disclosure is not limited thereto, and in other examples the LED brightness controller component 870 may enable brightness adaptation to ambient light level (e.g., control a brightness of the LED component(s) 535 based on an amount of ambient light brightness) during normal operation and may disable brightness adaptation when generating the visual effects during audio playback.

Figure 9:
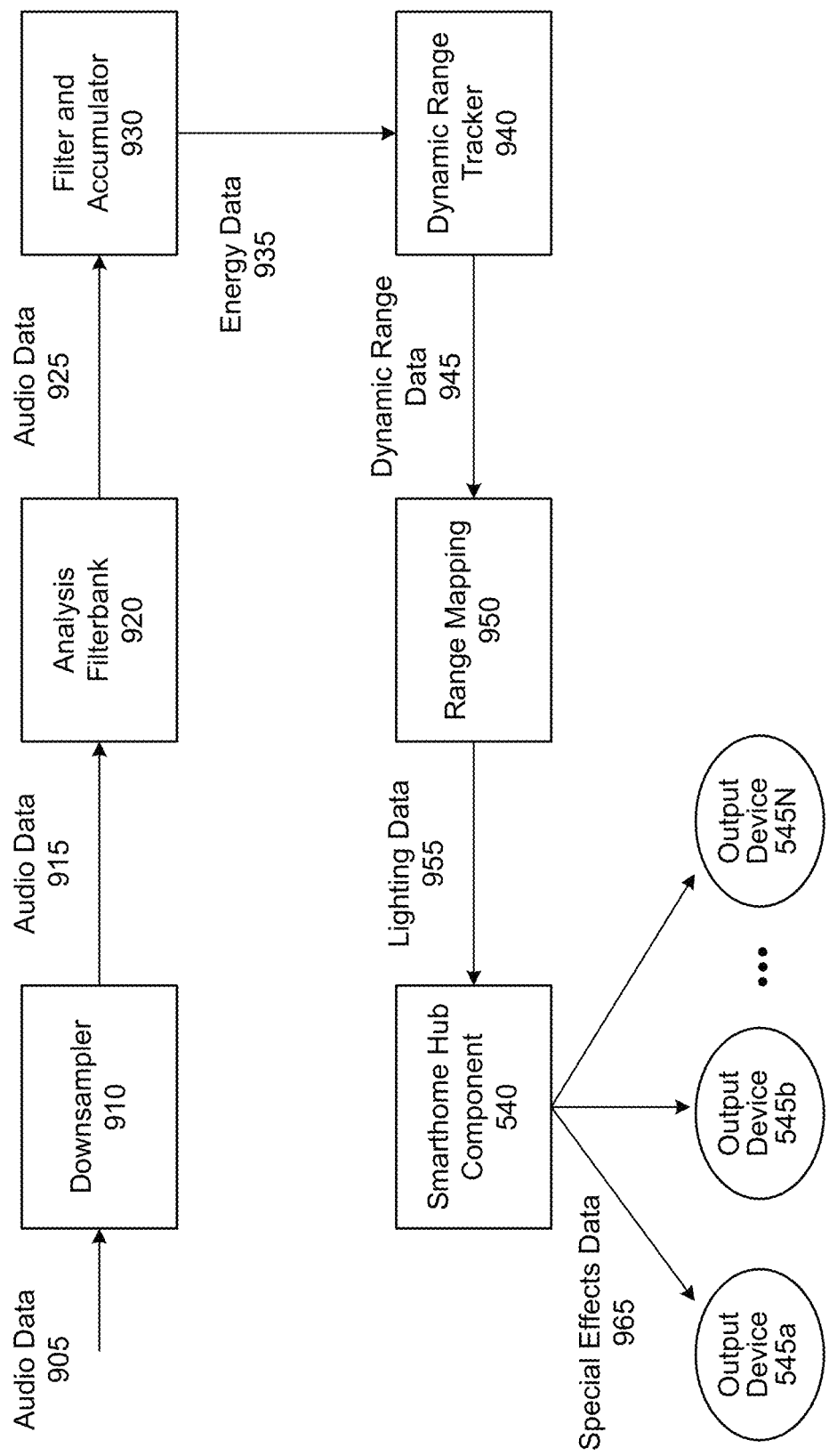
FIG. 9 illustrates an example of performing visualization processing according to embodiments of the present disclosure.

FIG. 9 illustrates an example of performing visualization processing according to embodiments of the present disclosure. As illustrated in FIG. 9, visualization processing 900 may be similar to the steps described above with regard to FIG. 8, although the disclosure is not limited thereto. While FIG. 8 illustrates a specific example in which the audio processor 520 sends lighting data to the LED controller component 530, the disclosure is not limited thereto and the audio processor 520 may send the lighting data to the smarthome hub component 540 without departing from the disclosure. Thus, some of the steps described with regard to FIG. 9 may be performed by the level/volume normalization component 830, the magnitude computation component 840, the LED visualizer component 850, and/or the RGB mapper component 860, although the disclosure is not limited thereto.

As illustrated in FIG. 9, a downsampler component 910 may receive first audio data 905 having a first sample rate (e.g., 48 kHz) and may perform downsampling to generate second audio data 915 having a second sample rate (e.g., 16 kHz), although the disclosure is not limited thereto and the sample rate and/or the second sample rate may vary without departing from the disclosure. An analysis filterbank component 920 may process the second audio data 915 to convert from a time domain to a frequency domain in order to generate third audio data 925 in the frequency domain.

A filter and accumulator component 930 may process the third audio data 925 and generate energy data 935, as described below with regard to FIG. 10. A dynamic range tracker component 940 may process the energy data 935 to generate dynamic range data 945, as described below with regard to FIGS. 11-12. Afterwards, a range mapping component 950 may process the dynamic range data 945 to generate the lighting data 955, as described below with regard to FIG. 13. Finally, the range mapping component 950 may send the lighting data 955 to the smarthome hub component 540 and the smarthome hub component 540 may send special effects data 965, which may include the lighting data 955, to the output devices 545. For example, the lighting data 955 may correspond to the HSL values described above, whereas the special effects data 965 may correspond to a command to generate a visual effect using the HSL values indicated by the lighting data 955, although the disclosure is not limited thereto.

Figure 10:
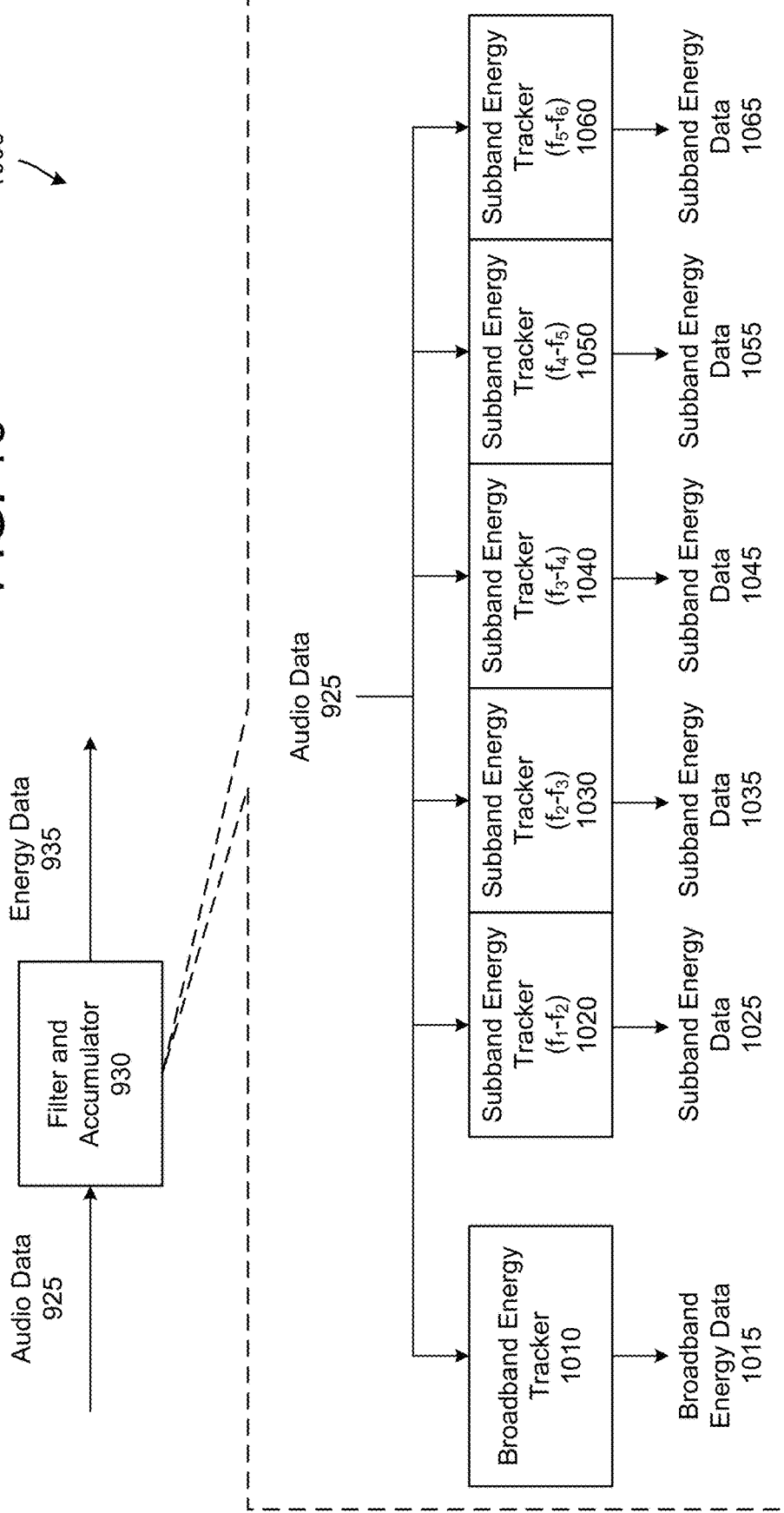
FIG. 10 illustrates an example of performing energy accumulation for individual frequency bands according to embodiments of the present disclosure.

FIG. 10 illustrates an example of performing energy accumulation for individual frequency bands according to embodiments of the present disclosure. As illustrated in FIG. 10, the filter and accumulator component 930 may perform energy accumulation to process the third audio data 925 and generate energy data 935. For example, a broadband energy tracker component 1010 may process the third audio data 925 and determine broadband energy data 1015 that is associated with all of the frequency bands (e.g., $f_1$-$f_6$).

Separately, multiple subband energy tracker components may process a portion of the third audio data 925 and determine subband energy data corresponding to an individual frequency band. For example, a first subband energy tracker component 1020 may process a first portion of the third audio data 925 corresponding to a first frequency band (e.g., $f_1$-$f_2$) to generate first subband energy data 1025, a second subband energy tracker component 1030 may process a second portion of the third audio data 925 corresponding to a second frequency band (e.g., $f_2$-$f_3$) to generate second subband energy data 1035, a third subband energy tracker component 1040 may process a third portion of the third audio data 925 corresponding to a third frequency band (e.g., $f_3$-$f_4$) to generate third subband energy data 1045, a fourth subband energy tracker component 1050 may process a fourth portion of the third audio data 925 corresponding to a fourth frequency band (e.g., $f_4$-$f_5$) to generate fourth subband energy data 1055, and a fifth subband energy tracker component 1060 may process a fifth portion of the third audio data 925 corresponding to a fifth frequency band (e.g., $f_5$-$f_6$) to generate fifth subband energy data 1065. While FIG. 10 illustrates an example in which the device 110 separately processes five frequency bands, the disclosure is not limited thereto and the device 110 may include any number of subband energy tracker components and/or may divide the third audio data 925 into any number of frequency bands without departing from the disclosure.

In some examples, the third audio data 925 may include a first number of discrete frequency bins (e.g., 64 frequency bins), although the disclosure is not limited thereto. For example, the third audio data 925 may be split uniformly into the first number of frequency bins, such that each frequency bin may correspond to a first size (e.g., 250 Hz), ranging from a $1^{st}$ frequency bin (e.g., 0-250 Hz) to a $64^{th}$ frequency bin (e.g., 15.75-16.0 kHz). However, a number of frequency bins associated with an individual frequency band may vary without departing from the disclosure. To illustrate an example, the first subband energy tracker component 1020 may be associated with first frequency bins (e.g., frequency bins 2-6), the second subband energy tracker component 1030 may be associated with second frequency bins (e.g., frequency bins 11-20), the third subband energy tracker component 1040 may be associated with third frequency bins (e.g., frequency bins 22-32), the fourth subband energy tracker component 1050 may be associated with fourth frequency bins (e.g., frequency bins 32-42), and the fifth subband energy tracker component 1060 may be associated with fifth frequency bins (e.g., frequency bins 43-63), although the disclosure is not limited thereto. Thus, the frequency bands tracked by the subband energy tracker components may include a varying number of frequency bins without departing from the disclosure.

In some examples, an individual subband energy tracker component may determine the subband energy data by performing energy accumulation for a corresponding frequency band. For example, during a first period of time, the first subband energy tracker component 1020 may determine a first average value associated with the first frequency band (e.g., $f_1$-$f_2$). During a second period of time after the first period of time, the first subband energy tracker component 1020 may process the first portion of the third audio data 925 to determine a first energy value corresponding to the first frequency band during first audio frame(s). To track the energy accumulation after the second period of time, the first subband energy tracker component 1020 may divide the first energy value by an update rate value to determine a first value. Thus, the first subband energy tracker component 1020 may determine a second average value associated with the first frequency band by adding the first average value and the first value. Similarly, the second subband energy tracker component 1030 may generate the second subband energy data 1035 by tracking an average energy value of the second frequency band (e.g., $f_2$-$f_3$) using the update rate value, the third subband energy tracker component 1040 may generate the third subband energy data 1045 by tracking an average energy value of the third frequency band (e.g., $f_3$-$f_4$) using the update rate value, and so on. Thus, the energy data 935 may include instantaneous values (e.g., first energy value) and/or average values (e.g., second average value) without departing from the disclosure.

Figure 11:
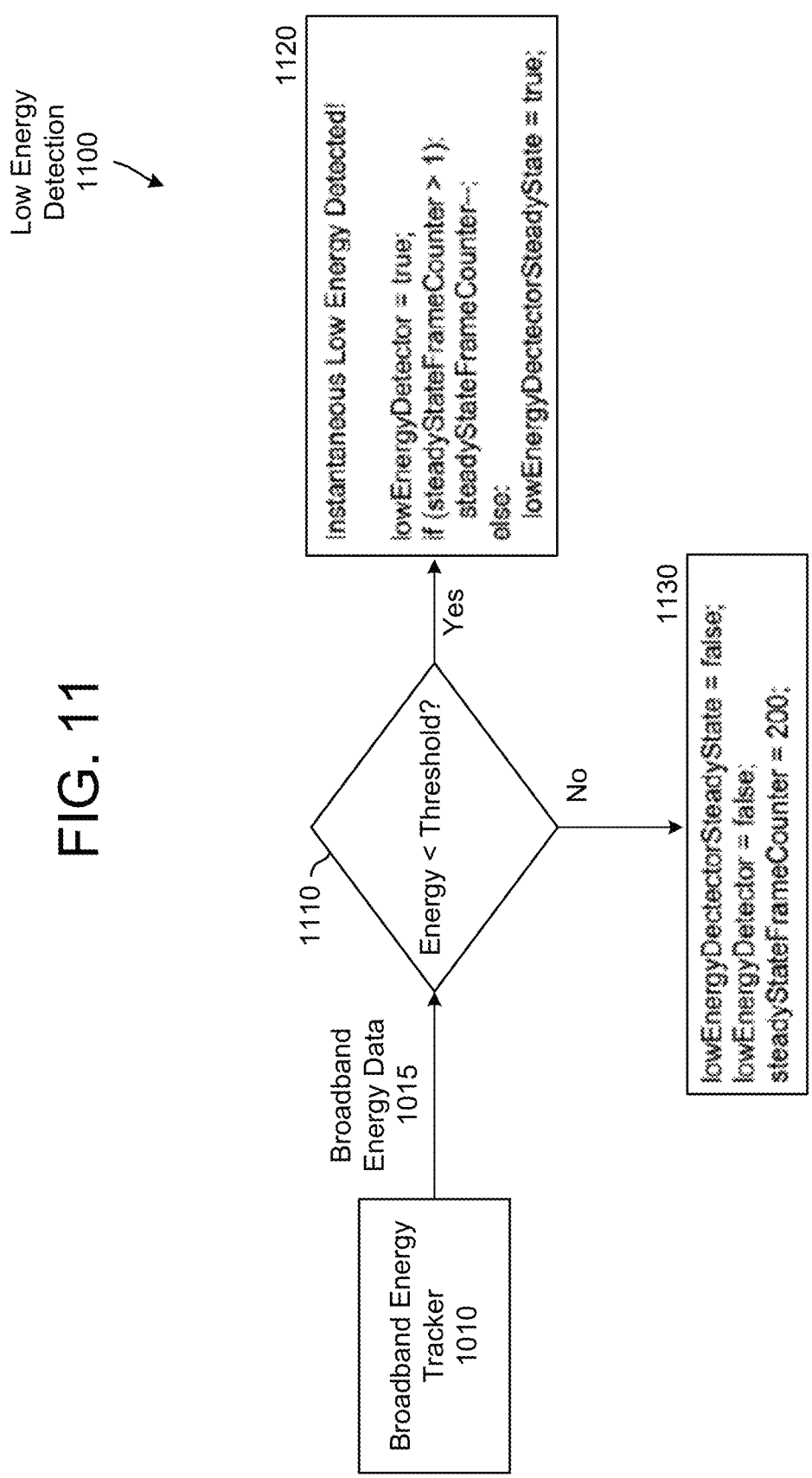
FIG. 11 illustrates an example of performing low energy detection according to embodiments of the present disclosure.

FIG. 11 illustrates an example of performing low energy detection according to embodiments of the present disclosure. As illustrated in FIG. 11, the device 110 may perform low energy detection 1100 using the broadband energy data 1015. For example, the device 110 may compare an energy value associated with the broadband energy data 1015 to a threshold value and determine (1110) whether the energy value is less than the threshold value. If the energy value is less than the threshold value, the device 110 may determine (1120) that instantaneous low energy is detected. For example, the device 110 may set a low energy detected flag by storing a first binary value (e.g., lowEnergyDetector=true) and, if a duration of time has not elapsed, the device 110 may decrement a steady state frame counter (e.g., steadyStateFrameCounter--). However, if the duration of time has elapsed, such as when the steady state frame counter is less than a threshold value (e.g., steadyS-tateFrameCounter≤1), the device 110 may determine that the audio data is in a low energy steady state and may set a low energy steady state flag by storing the first binary value (e.g., lowEnergyDetectorSteadyState=true).

If the device 110 determines in step 1110 that the energy value is not less than the threshold value, the device 110 may determine (1130) that instantaneous low energy is not detected. For example, the device 110 may reset the low energy detected flag by storing a second binary value (e.g., lowEnergyDetector=false), may reset the low energy steady state flag by storing the second binary value (e.g., lowEnergyDetectorSteadyState=false), and may reset the steady state frame counter to a first value (e.g., steadyStateFrameCounter=200). Thus, the device 110 will not determine that the audio data is in the low energy steady state until instantaneous low energy is detected for 199 consecutive audio frames.

FIG. 12 illustrates an example of performing dynamic range tracking according to embodiments of the present disclosure. As illustrated in FIG. 12, the device 110 may perform dynamic range tracking 1200 by tracking a minimum percentile and a maximum percentile for each frequency band. For example, the dynamic range tracker component 940 may generate the dynamic range data 945 by processing the energy data 935 individually for each frequency band.

As illustrated in FIG. 12, the dynamic range tracker component 940 may only update a minimum percentile tracker or a maximum percentile tracker when an average energy value associated with the frequency band exceeds a threshold value (e.g., AvgEnergy>Threshold). When the average energy value exceeds the threshold value, the minimum percentile tracker may determine if the average energy value is below a minimum energy value (e.g., eMin>AvgEnergy). If so, the minimum percentile tracker may use the average energy value to determine a minimum delta value (e.g., eMinDelta=eMin−AvgEnergy) and update the minimum energy value (e.g., eMin=AvgEnergy) and then may reset a minimum frame counter value (e.g., minFrameCnt=0). If the average energy value is not below the minimum energy value, the minimum percentile tracker may increment the minimum frame counter value (e.g., minFrameCnt++). The minimum percentile tracker may then determine whether the minimum frame counter value exceeds a counter threshold value (e.g., minFrameCnt>countThresh) and, if so, may determine a new minimum energy value (e.g., eMin=eMin+MIN(0.05 (eMax−eMin), eMinDelta)).

Similarly, when the average energy value exceeds the threshold value, the maximum percentile tracker may determine if the average energy value is above a maximum energy value (e.g., eMax<AvgEnergy). If so, the maximum percentile tracker may use the average energy value to determine a maximum delta value (e.g., eMaxDelta=AvgEnergy−eMax) and update the maximum energy value (e.g., eMax=AvgEnergy) and then may reset a maximum frame counter value (e.g., maxFrameCnt=0). If the average energy value is not above the maximum energy value, the maximum percentile tracker may increment the maximum frame counter value (e.g., maxFrameCnt++). The maximum percentile tracker may then determine whether the maximum frame counter value exceeds a counter threshold value (e.g., maxFrameCnt>countThresh) and, if so, may determine a new maximum energy value (e.g., eMax=eMax−MIN(0.05(eMax−eMin), eMaxDelta)).

Finally, if the maximum energy value is less than or equal to the minimum energy value, the dynamic range tracker component 940 may set the maximum energy value to be greater than the minimum energy value by a first value (e.g., eMax=eMin+0.01), although the disclosure is not limited thereto.

Figure 13:
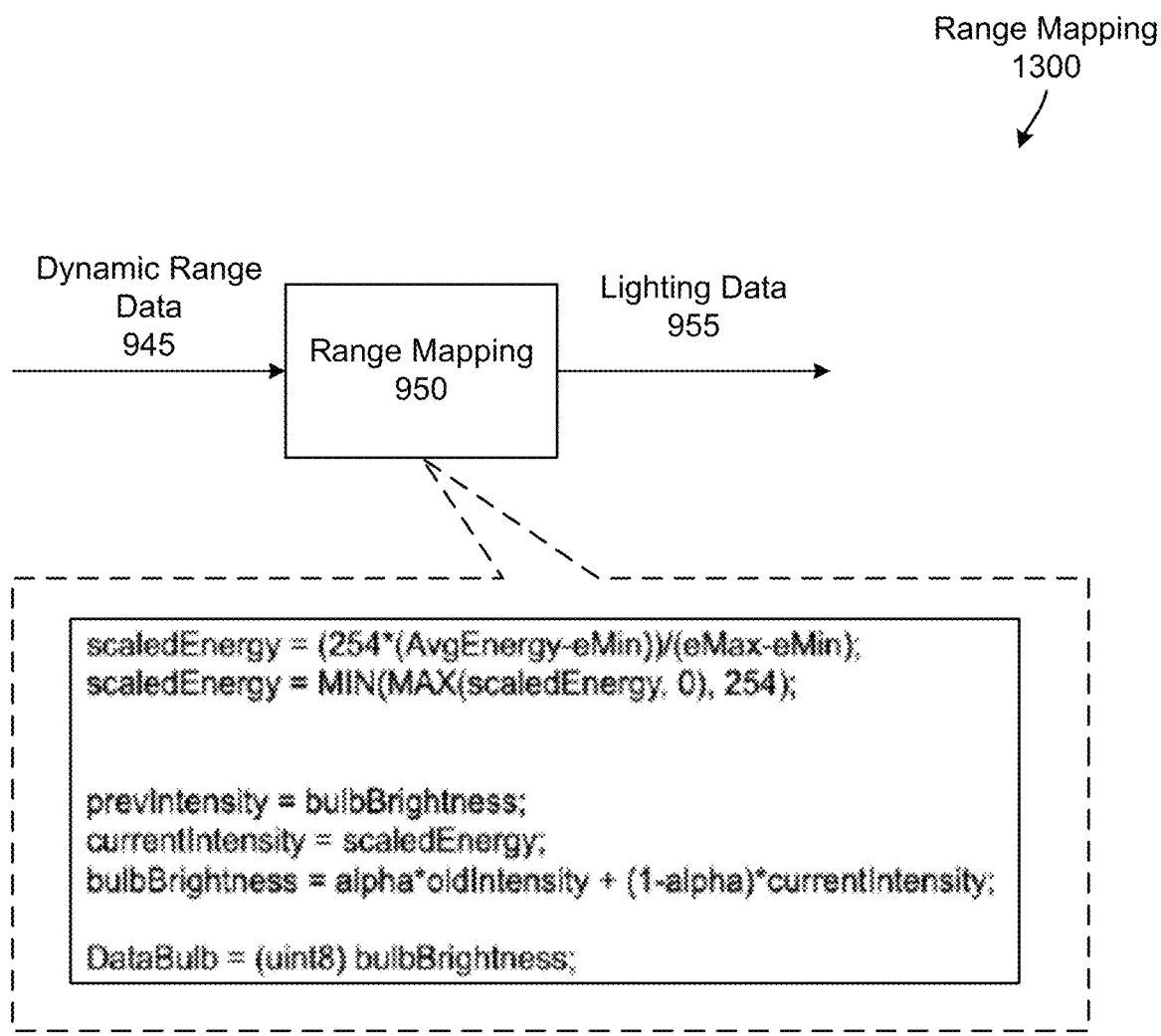
FIG. 13 illustrates an example of performing range mapping according to embodiments of the present disclosure.

FIG. 13 illustrates an example of performing range mapping according to embodiments of the present disclosure. As illustrated in FIG. 13, the range mapping component 950 may perform range mapping 1300 by processing the dynamic range data 945 to generate the lighting data 955. In some examples, the range mapping component 950 may only generate a portion of the lighting data 955 without departing from the disclosure. For example, the range mapping component 950 may perform range mapping 1300 to generate brightness values (e.g., level values) indicating an amount of brightness (e.g., intensity) associated with a color without departing from the disclosure. Thus, the range mapping component 950 may determine the lighting data 955 using a combination of the dynamic range data 945 and other data without departing from the disclosure.

As illustrated in FIG. 13, the range mapping component 950 may generate a brightness value of the lighting data 955 by mapping an average energy value to a scaled energy value associated with a first range (e.g., 0-254) based on the minimum energy value and the maximum energy value. For example, the device 110 may determine a raw scaled energy value (e.g., scaledEnergy=(254*(AvgEnergy−eMin)/ (eMax−eMin)) and limit the raw scaled energy value to the first range (e.g., scaledEnergy=MIN(MAX(scaledEnergy, 0), 254)). The device 110 may then determine the previous intensity value (e.g., prevIntensity=bulbBrightness), the current intensity value (e.g., currentIntensity=scaledEnergy), and determine a brightness value to include in the lighting data 955 (e.g., bulbBrightness=alpha*oldIntensity+(1−alpha)*currentIntensity).

Figure 14:
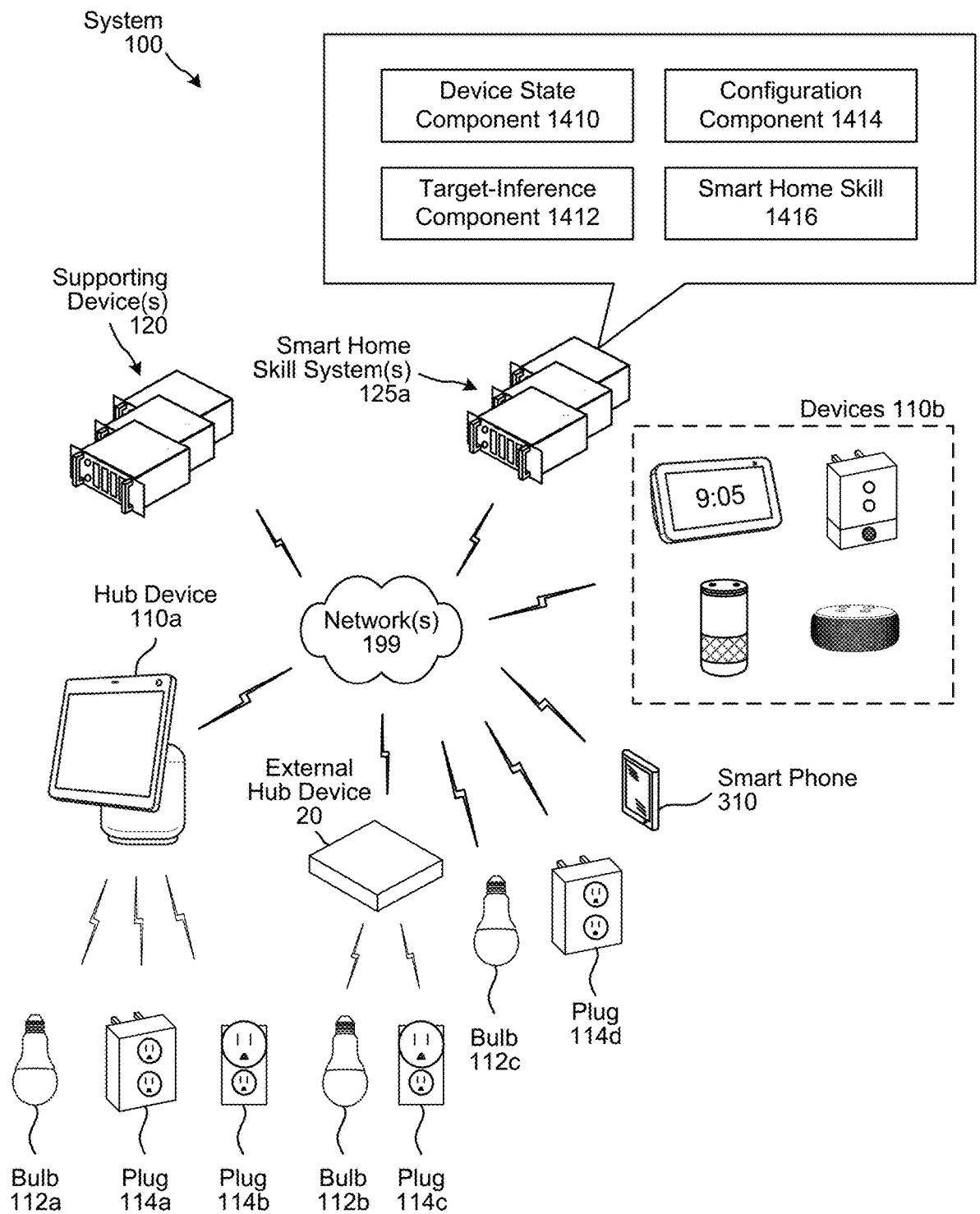
FIG. 14 illustrates a schematic diagram of an example system for a smart home environment.

FIG. 14 illustrates a schematic diagram of an example system for a smart home environment. As illustrated in FIG. 14, the system 100 may include the smart home skill system(s) 125*a* configured to monitor device state data and/or event data associated with one or more device(s) 110 and/or output device(s) 112. For example, the smart home skill system(s) 125*a* may receive device state data from and/or send commands to each of a plurality of devices (110/112/114), enabling the smart home skill system(s) 125*a* to remotely control and/or monitor the plurality of devices (110/112/114) in a smart home environment. Additionally or alternatively, the smart home skill system(s) 125*a* may receive event data generated by the plurality of devices (110/112/114), enabling the smart home skill system(s) 125*a* to track activity detected by sensors connected to the plurality of devices (110/112/114).

In some examples, the system 100 may include the supporting device(s) 120 configured to enable a voice interface and interpret voice commands, although the disclosure is not limited thereto. For example, some of the devices 110 may be voice-enabled and configured to receive user utterances and perform operations in response to such user utterances. In these examples, the voice-enabled devices 110 may be "hands free" such that interactions with the devices are performed through audible requests and responses.

As illustrated in FIG. 14, some of the devices 110 (e.g., smartphone 310, bulb 112*c*, and smart plug 114*d*) may be configured to communicate with the smart home skill system(s) 125*a* directly via the network(s) 199, while other devices (e.g., 112*a*-112*b*, 114*a*-114*c*) may be configured to communicate with the smart home skill system(s) 125*a* indirectly via hub device 110*a* and/or external hub device 20. For example, the smart plug 114*d* may send data to the smart home skill system(s) 125*a* via the network(s) 199, whereas the smart plug 114*c* may send data to an external hub device 20 and the external hub device 20 may send the data to the smart home skill system(s) 125*a* via the network(s) 199.

The system 100 may also include a hub device 110*a*. A hub device may be referred to as a "home controller," gateway and/or other type of "hub," and may assist in controlling associated smart-home devices. In some examples, smart devices may be paired to the hub device, typically by following instructions to physically place the smart device and the hub device into a join mode, which may also be described as a pairing mode, and/or by utilizing a hub-associated application stored on and/or accessed by a web and/or mobile phone. Thereafter, the hub device may be utilized to control operations associated with the smart device. As illustrated in FIG. 14, the first hub device 110*a* may correspond to a device 110 that is configured to interpret voice commands, generate output audio, and/or perform other functionality while also connecting to one or more devices (e.g., smart bulb 112*a*, smart plugs 114*a*-114*b*). In contrast, the external hub device 20 may be configured specifically to connect to one or more devices (e.g., smart bulb 112*b*, smart plug 114*c*, etc.) without performing additional functionality without departing from the disclosure.

While FIG. 14 illustrates the hub device 110*a* connecting to smart bulb 112*a* and smart plugs 114*a*-114*b*, the disclosure is not limited thereto and the hub device 110*a* may connect to any number of devices 110, smart bulbs 112, smart plugs 114, and/or the like without departing from the disclosure.

The devices 110, bulbs 112, plugs 114, and/or the like that connect to the hub device 110*a* may be described as "smart" devices, which may have certain computing components and be configured to send and/or receive data from other devices. For example, these smart devices may correspond to light bulbs, plugs, locks, televisions, appliances, doorbells, cameras, etc. These devices 110/112/114 may be "paired" or otherwise associated with a voice-enabled device (e.g., devices 110*b*), a hub device (e.g., hub device 110*a*), and/or a user account, although the disclosure is not limited thereto.

The devices 110/112/114 may be configured to send data to and/or receive data from the supporting device(s) 120 and/or the smart home skill system(s) 125*a* via the network 199. As discussed above, one or more of the components of the system 100 may communicate directly with the supporting device(s) 120 and/or the smart home skill system(s) 125*a* via the network 199. However, the disclosure is not limited thereto, and one or more the components of the system 100 may communicate indirectly with the supporting device(s) 120 and/or the smart home skill system(s) 125*a* via another device, such as the hub device 110*a*. Additionally or alternatively, a personal device, such as a smartphone 310, may communicate directly with the devices 110/112/114, the supporting device(s) 120, and/or the smart home skill system(s) 125*a* without departing from the disclosure.

The devices 110/112/114 may include one or more components, such as, for example, one or more microphones, one or more speakers, one or more displays, one or more cameras, and/or sensor components (e.g., motion sensor, proximity sensor, etc.). The microphones may be configured to capture audio, such as user utterances, and generate corresponding audio data. The speakers may be configured to output audio, such as audio corresponding to audio data received from another device 110/112/114, the supporting device(s) 120, and/or the smart home skill system(s) 125*a*. The displays may be configured to present images, such as images corresponding to image data received from another device 110/112/114, the supporting device(s) 120 and/or the smart home skill system(s) 125*a*.

In some examples, the devices 110/112/114 may be configured to activate and/or deactivate device functionality components. For example, the smart bulb 110*a* may be a light bulb, and in this example, the device functionality components may include a filament and/or light emitting diode that may produce and/or emit light. Additionally or alternatively, the smart plug 110*a* may be a wall plug, and in this example, the device functionality components may include an "on/off mechanism" for causing electricity to flow or not flow to a device that is plugged in to the wall plug. It should be noted that the device functionality components illustrated here are by way of example only and the disclosure is not limited thereto.

The personal device (e.g., smartphone 310) may include one or more components such as one or more applications residing on memory of the personal device and/or residing elsewhere. The applications may be configured to cause processors of the personal device to display one or more user interfaces associated with operations of the devices 110/112/114. The user interfaces may be utilized to receive inputs from the user of the personal device and/or to provide content to the user.

The supporting device(s) 120 may include an automatic speech recognition (ASR) component, a natural language understanding (NLU) component, a text-to-speech (TTS) component, and/or the like. Thus, the supporting device(s) 120 may be configured to enable a voice interface and perform additional functionality without departing from the disclosure.

The smart home skill system(s) 125*a* may include a device state component 1410, a target-inference component 1412, a configuration component 1414, and/or a smart home skill 1416. Each of the components described herein with respect to the smart home skill system(s) 125*a* may be associated with their own systems, which collectively may be referred to herein as the smart home skill system(s) 125*a*, and/or some or all of the components may be associated with a single system.

The device state component 1410 may be configured to monitor a device state for each of the individual devices 110. For example, a device 110/112/114 may undergo state changes, such as being turned on and off. Additionally or alternatively, the device 110/112/114 may operate in different states, such as outputting audio, detecting a motion event, and/or the like. Data indicating the occurrence of these state changes and/or additional information, such as the current device state, a time associated with a transition between device states, and/or the like, may be sent from the device 110/112/114 to the smart home skill system(s) 125*a* and stored by the device state component 1410.

The target-inference component 1412 may be configured to determine which of the plurality of devices 110/112/114 to operate based at least in part on receiving audio data representing a user utterance from a user 5. For example, a user 10 may speak a user utterance to perform functionality and corresponding audio may be captured by the microphones of one of the devices 110. The device 110 may generate audio data representing the user utterance and may send the audio data to the supporting device(s) 120 for speech processing. In some examples, the supporting device(s) 120 may attempt to determine which device 110/112/114 to operate in light of the user utterance. For example, the user utterance may include "turn on study light." The ASR component may generate text data corresponding to the audio data and the NLU component may generate intent data indicating that the user utterance is associated with a "turn on" intent and that the device to be acted on has a naming indicator of "study light." In these examples, the smart home skill system(s) 125*a* may be designated as a component that may handle and/or otherwise perform operations corresponding to a "turn on" intent. The supporting device(s) 120 may communicate the intent data and/or other data to the smart home skill system(s) 125*a* using the smart home skill 1416. The smart home skill 1416 may attempt to identify the device 110 to be operated using the data received from the supporting device(s) 120 and/or from one or more other components, such as an internet-of-things component.

The user 5, the supporting device(s) 120, the smart home skill system(s) 125*a*, and/or a third-party system may have given naming indicators to the devices 110 associated with the user profile associated with the user 5. However, in this example, none of the naming indicators may be "study light" and/or multiple naming indicators may correspond to "study light." Therefore, the target-inference component 1412 of the smart home skill system(s) 125*a* may perform target inference operations to identify which of the multiple devices 110/112/114 is most likely to be the "study light." The target inference operations may include determining which device is most likely in the "on" state at the time the audio data was received by the supporting device(s) 120. For example, the target-inference component 1412 may determine that 1% of the devices 110 associated with a first device with the naming indicator of "kitchen light" are in the "unlocked" state. The target-inference component 1412 may further determine that 50% of the devices 110/112/114 associated with a second device with the naming indicator of "bedroom light" are in the "unlocked" state. The target-inference component 1412 may further determine that 97% of the devices 110/112/114 associated with a third device with the naming indicator of "office light" are in the "on" state. Based at least in part on this analysis, the target-inference component 1412 may determine that the third device is most likely the device that the user desires to operate.

Additionally or alternatively, the state prediction operations described herein may be utilized when configuring a device 110/112/114 for scheduled state changes. For example, a user 5 may desire to set a schedule for a device 110 to be activated and deactivated during, for example, a given day. While the user 5 may manually set such a schedule, the user 5 may additionally, or alternatively, desire to automatically set a schedule based on typical usage patterns for devices like the selected device. To do so, the configuration component 1414 may determine when state changes generally occur for a subset of the devices 110 that are similar to the selected device. Scheduling data indicating the schedule of such state changes may be generated and a recommendation indicating the schedule may be sent to the device 110/112/114 and/or the personal device associated with the user 5 to configure the selected device for scheduled state changes utilizing the schedule. Based at least in part on receiving input data representing an acceptance of the recommendation, the configuration component 1414 may configure the selected device using the schedule.

Additionally, or alternatively, the state prediction operations described herein may be utilized to determine which devices to transition states at a given time and/or in response to a user request. For example, a user may speak a "good night" or "good morning" user utterance to one of the device 110 configured to be voice enabled. In other examples, the user may provide input to a personal device (e.g., smartphone 310) that corresponds to a "good night" or "good morning" request. In these examples, the user utterance may be associated with an intent to operate one or more devices 110/112/114 that a user would typically operate when they are going to bed and/or getting up for the morning. For example, when going to bed, the user 5 may desire to lock the doors, turn off certain lights, turn on other lights, adjust thermostat temperatures, etc. The state prediction operations described herein may be utilized to determine which of the devices 110/112/114 to operate when a user command such as those described with respect to these examples is received.

Additionally, or alternatively, the state prediction operations described herein may be utilized to determine which devices 110/112/114 to operate and/or not operate when a user is not present in a space with the devices 110/112/114. For example, the supporting device(s) 120, the smart home skill system(s) 125*a*, and/or the device 110 may determine that a user is not present in the space. This determination may be made, for example, by determining that audio has not been received at the microphones of the device 110 and/or audio is received below a threshold amount and/or a threshold intensity. Additionally, or alternatively, the determination may be made based at least in part on image data representing one or more images of the space not depicting a user. Additionally, or alternatively, the determination may be made based at least in part on a signal not being received from a personal device (e.g., smartphone 310) associated with the user. In examples where it is determined that a user is not present in the space, devices 110/112/114 may be activated based at least in part on their predicted state. Additionally, or alternatively, devices 110/112/114 may restricted from activation during this time period, which may prevent such devices from being activated when not desired.

The smart home skill 1416 described herein may include a speech-enabled web component that may run in the supporting device(s) 120 and/or the smart home skill system(s) 125*a*. Skill(s) may receive and respond to user-initiated requests. Skill(s) may define life-cycle events for a skill as experienced by a user, a way to process requests from the user, and/or call-backs from events happening on the device the user is interacting with. Given skill(s) may be capable of handling certain intents. For example, the NLU component may generate intent data that indicates an intent as well as a payload associated with the intent. A skill may be associated with the intent, and thus the intent data, including the payload may be sent to and received by the skill. The skill may process that intent by analyzing the payload and generating data representing a directive and/or instruction to perform an action. The directive and/or instruction may be sent to other components of the system for performance of the action.

After processing a user request and generating the directive, the supporting device(s) 120 and/or the smart home skill system(s) 125*a* may publish (i.e., write) some or all of this information to an event bus. That is, the supporting device(s) 120 and/or the smart home skill system(s) 125*a* may provide information regarding the initial request (e.g., the speech, the text, the domain/intent, etc.), the response to be provided to a device 110/112/114, or any other information pertinent to the interaction between the device 110/112/114 and the supporting device(s) 120 and/or the smart home skill system(s) 125*a* to the event bus.

Within the supporting device(s) 120 and/or the smart home skill system(s) 125*a*, one or more components or services may subscribe to the event bus so as to receive information regarding interactions between the devices 110/112/114 and the user 5. For example, the smart home skill system(s) 125*a* may subscribe to the event bus and, thus, may monitor information regarding these interactions. In some examples, monitoring information in the event bus may comprise messages between various components of the supporting device(s) 120 and/or the smart home skill system(s) 125*a*. For example, the device state component 1410 may monitor the event bus to identify device state data for the devices 110/112/114. In some examples, the event bus may "push" or send indications of events and/or device state data to one or more components and/or devices 110/112/114. For example, the event bus may send indications of events and/or device state data to the smartphone 310 and/or the smart home skill system(s) 125*a*. Additionally, or alternatively, the event bus may be "pulled" where a component sends requests to the event bus to provide an indication of device state data for a particular device 110/112/114.

The event bus may store indications of the device states for the devices, such as in a database (e.g., profile storage, event database associated with the smart home skill system(s) 125*a*, etc.), and using the stored indications of the device states, send the device state data for the devices 110/112/114 to the supporting device(s) 120 and/or the smart home skill system(s) 125*a*. Thus, to identify device state data for a device 110/112/114, a component may send a request to the event bus (e.g., event component) to provide an indication of the device state data associated with a device 110/112/114, and receive, from the event bus, the device state data that was requested.

In some examples, the supporting device(s) 120 and/or the smart home skill system(s) 125*a* may monitor information published to the event bus and identify events that may trigger action. For instance, the supporting device(s) 120 and/or the smart home skill system(s) 125*a* may identify (e.g., via filtering) those events that: (i) come from voice-enabled devices that are associated with secondary device(s) (e.g., have secondary devices in their environments such as televisions, personal computing devices, accessory devices, etc.), and (ii) are associated with supplemental content (e.g., image data, video data, etc.). The supporting device(s) 120 and/or the smart home skill system(s) 125*a* may reference a user registry to determine which voice-enabled devices are associated with secondary devices, as well as determine device types, states, and other capabilities of these secondary devices. For instance, the supporting device(s) 120 and/or the smart home skill system(s) 125*a* may determine, from the information published to the event bus, an identifier associated with the voice-enabled device making the corresponding request or the voice-enabled device selected to respond to or act upon the user utterance. The supporting device(s) 120 and/or the smart home skill system(s) 125*a* may use this identifier to identify, from the user registry, a user profile associated with the voice-enabled device and/or determine whether any secondary devices have been registered with the identified user profile, as well as capabilities of any such secondary devices, such as how the secondary devices are configured to communicate (e.g., via Wi-Fi, short-range wireless connections, etc.), the type of content the devices are able to output (e.g., audio, video, still images, flashing lights, etc.), and the like.

The supporting device(s) 120 and/or the smart home skill system(s) 125*a* may determine whether a particular event identified is associated with supplemental content. That is, the supporting device(s) 120 and/or the smart home skill system(s) 125*a* may write, to a datastore, indications of which types of events and/or which primary content or responses are associated with supplemental content. In some instances, the supporting device(s) 120 and/or the smart home skill system(s) 125*a* may provide access to third-party developers to allow the developers to register supplemental content for output on secondary devices for particular events and/or primary content. For example, if a voice-enabled device is to output that the weather will include thunder and lightning, the supporting device(s) 120 and/or the smart home skill system(s) 125*a* may store an indication of supplemental content such as thunder sounds, pictures/animations of lightning and the like. In another example, if a voice-enabled device is outputting information about a particular fact (e.g., "a blue whale is the largest mammal on earth . . . "), then a secondary device, such as television, may be configured to provide supplemental content such as a video or picture of a blue whale. In another example, if a voice-enabled device is outputting audio, then a second device, such as a speaker, may be configured to also output the audio based at least in part on a user utterance representing a request to add the secondary device to the audio session. In these and other examples, the supporting device(s) 120 and/or the smart home skill system(s) 125*a* may store an association between the primary response or content (e.g., outputting of information regarding the world's largest mammal) and corresponding supplemental content (e.g., the audio data, image data, or the like). In some instances, the supporting device(s) 120 and/or the smart home skill system(s) 125*a* may also indicate which types of secondary devices are to output which supplemental content. For example, the supporting device(s) 120 and/or the smart home skill system(s) 125*a* may store an indication that secondary devices of a class type "tablet" are to output a picture of a blue whale. In these and other instances, meanwhile, the supporting device(s) 120 and/or the smart home skill system(s) 125*a* may store the supplemental content in association with secondary-device capabilities (e.g., devices with speakers output the audio commentary, devices with screens output the image, etc.).

The supporting device(s) 120 and/or the smart home skill system(s) 125*a* may also determine how to transmit response and/or supplement content (and/or information acquiring the content) to the devices 110/112/114 (e.g., voice-enabled devices and/or the secondary devices). To make this determination, the supporting device(s) 120 and/or the smart home skill system(s) 125*a* may determine a device type of the voice-enabled devices and/or secondary devices, capabilities of the device(s), or the like, potentially as stored in the user registry. In some instances, the supporting device(s) 120 and/or the smart home skill system(s) 125*a* may determine that a particular device is able to communicate directly and may provide the response and/or content directly over the network(s) 199 to the secondary device (potentially via the supporting device(s) 120). In another example, the supporting device(s) 120 and/or the smart home skill system(s) 125*a* may determine that a particular secondary device is unable to communicate directly with the supporting device(s) 120 and/or the smart home skill system(s) 125*a*, but instead is configured to communicate with the hub device 110*a* in its space over short-range wireless networks. As such, the supporting device(s) 120 and/or the smart home skill system(s) 125*a* may send the supplement content (or information) to the hub device 110*a*, which may send the information over a short-range network to the secondary device.

The supporting device(s) 120 and/or the smart home skill system(s) 125*a* may include the user registry (e.g., profile storage, database associated with the smart home skill system(s) 125*a*, etc.) that includes data regarding user profiles as described herein. The user registry may be located part of, or proximate to, the supporting device(s) 120 and/or the smart home skill system(s) 125*a*, although the disclosure is not limited thereto and the user registry may be separate and may communicate with the supporting device(s) 120 and/or the smart home skill system(s) 125*a* via the network(s) 199 without departing from the disclosure.

The user registry may include a variety of information related to individual users, user profiles, accounts, etc. that interact with the devices 110/112/114, the supporting device(s) 120, and/or the smart home skill system(s) 125*a*. For example, the user registry may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry may store indications of associations between various devices 110/112/114 (e.g., between voice-enabled devices and/or secondary device), such as virtual clusters of devices, states of devices, and associations between devices and audio-session queues. The user registry may represent clusters of devices as single devices that can receive commands and disperse the commands to each device and/or to the cluster. In some examples, the virtual cluster of devices may be represented as a single device which is determined as being capable, or not capable (e.g., offline), of performing a command in a user utterance. A virtual cluster of devices may generally correspond to a stored grouping of devices, or a stored association between a group of devices.

In some examples, the device state for devices associated with a user account may indicate a current state of the device. In this way, the smart home skill 1416 and/or other skills may determine, based on the stored device states in the user registry, a current device state of the devices 110/112/114. Rather than receiving device states for the voice-enabled devices, in metadata, the device states may already have been determined or received and stored in the user registry. Further, the user registry may provide indications of various permission levels depending on the user. As an example, the supporting device(s) 120 may perform speaker recognition on audio signals to determine an identity of the speaker. If the speaker is a child, for instance, the child profile may have permission restrictions where they are unable to request audio to be output via certain devices and/or to output certain audio on one or more of the devices, for example. Conversely, a parent profile may be able to direct output of audio without restrictions.

In some examples, to determine the device state, the event bus may publish different events which indicate device states to various entities or components that subscribe to the event bus. For instance, if an event of "turn on office lights" occurs for a voice-enabled device, the event bus may publish the indication of this event, and thus the device state of the voice-enabled device from which the audio data was received may be determined. Thus, various components may be provided with indications of the various device states via the event bus. The event bus may further store and/or update device states for the devices 110/112/114 in the user registry. The components of the supporting device(s) 120 and/or the smart home skill system(s) 125*a* may query the user registry to determine device states.

A particular user profile may include a variety of data that may be used by the supporting device(s) 120 and/or the smart home skill system(s) 125a. For example, a user profile may include information about what device(s) 110/112/114 are associated with the user and/or user profile. The user profile may further indicate an IP address for each of the devices 110/112/114 associated with the user and/or user profile, user IDs for the devices 110, indications of the types of devices, and current device states for the devices.

The user registry component may be configured to identify, determine, and/or generate associations between users, user accounts, and/or devices. For example, one or more associations between user accounts may be identified, determined, and/or generated by the user registry. The user registry may additionally store information indicating one or more applications and/or resources accessible to and/or enabled for a given user account. Additionally, the user registry may include information indicating device identifiers, such as naming identifiers, associated with a given user account, as well as device types associated with the device identifiers. The user registry may also include information indicating user account identifiers, naming indicators of devices associated with user accounts, and/or associations between the devices 110/112/114. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data stores may be configured to identify, determine, and/or generate data associated with use of the devices 110/112/114. Usage data may be identified, determined, and/or generated that indicates some or each of these interactions. Timing data may also be identified, determined, and/or generated that indicates a time at which some or each of these interactions took place. Device-state data, and/or other usage data may also be identified, determined, and/or generated. In some examples, the user registry and the data stores may be separate components, although the disclosure is not limited thereto and in other examples the user registry and the data stores may be a single component. In other examples, the data stores may be operated and/or maintained by a third-party system other than the supporting device(s) 120 and/or the smart home skill system(s) 125a, and the supporting device(s) 120 and/or the smart home skill system(s) 125a may have access to the data stores.

Figure 15:
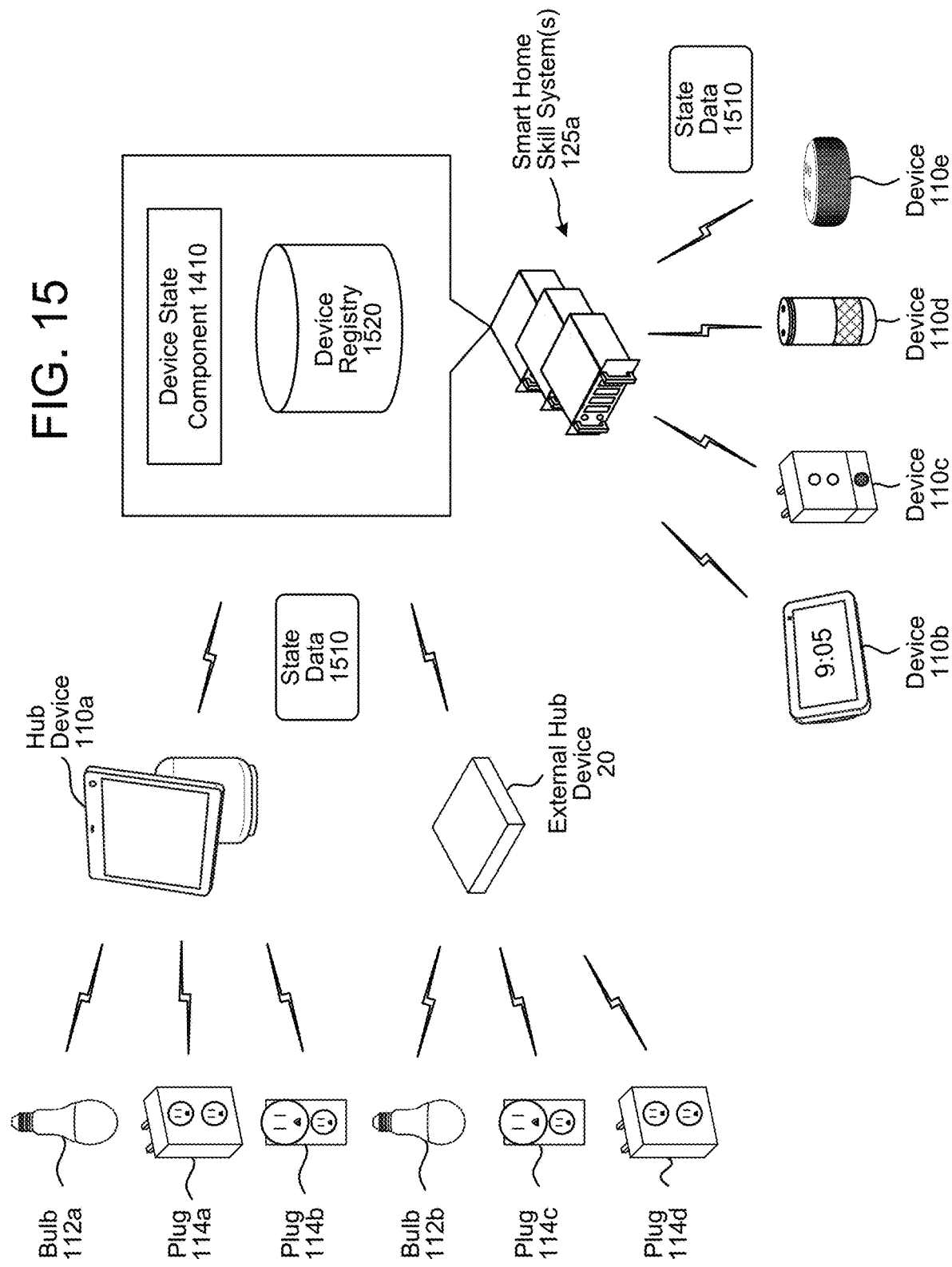
FIG. 15 illustrates a conceptual diagram of devices and data utilized in a smart home environment.

FIG. 15 illustrates a conceptual diagram of devices and data utilized in a smart home environment. As illustrated in FIG. 15, some devices (e.g., hub device 110a, external hub device 20, and/or devices 110b-110e) may communicate directly with the smart home skill system(s) 125a, while other devices 110 (e.g., bulbs 112 and plugs 114) may communicate with the smart home skill system(s) 125a indirectly via the hub device 110a and/or the external hub device 20. For example, the hub device 110a and/or the devices 110b-110e may send state data 1510 to the smart home skill system(s) 125a via the network(s) 199, while the bulbs 112 and plugs 114 may send state data 1510 to the hub device 110a/external hub device 20 and then the hub devices may send the state data 1510 to the smart home skill system(s) 125a.

As described above, the smart home skill system(s) 125a may include a device state component 1410 configured to monitor a device state for each of the individual devices 110/112/114. For example, a device 110/112/114 may undergo state changes, such as being turned on and off. Additionally or alternatively, the device 110/112/114 may operate in different states, such as outputting audio, detecting a motion event, and/or the like. Data indicating the occurrence of these state changes and/or additional information, such as the current device state, a time associated with a transition between device states, and/or the like, may be sent from the device 110 to the smart home skill system(s) 125a and stored by the device state component 1410.

In some examples, the smart home skill system(s) 125a may store information about the device and/or the device state in a device registry 1520. For example, the device registry 1520 may be configured to store the state data as well as identifying information associated with each of the devices 110/112/114, although the disclosure is not limited thereto.

Figure 16:
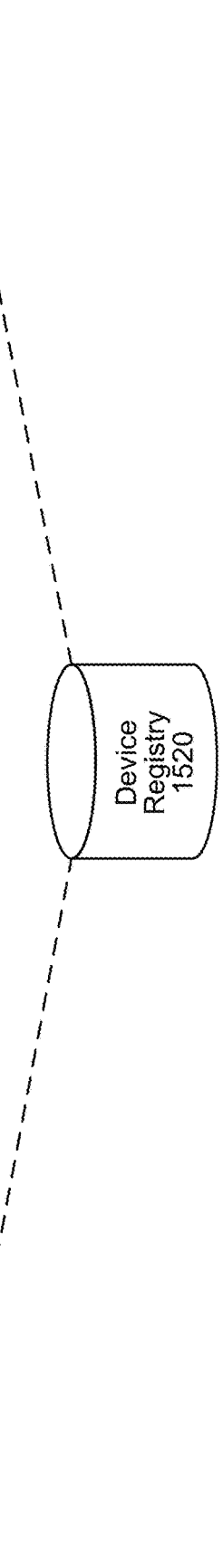
FIG. 16 illustrates an example of information included in a device registry.

FIG. 16 illustrates an example of information included in a device registry. As illustrated in FIG. 16, the device registry 1520 may include an entry for each of the devices 110/112/114 associated with an account. In the example illustrated in FIG. 16, each entry may indicate a customer profile (e.g., customer identification), which may correspond to a user profile (e.g., individual user) or the overall account, device identification (ID) (e.g., unique device identifier), an Internet Protocol (IP) address associated with the device, a device name, one or more qualifiers (e.g., indicating a location or other attributes of the device), a device state (e.g., outputting audio, idle, etc.), and/or the like. However, the disclosure is not limited thereto and the device registry 1520 may include any information known to one of skill in the art without departing from the disclosure.

While the device registry 1520 may include multiple columns of information, an individual entry in the device registry 1520 may lack information for one or more columns of information without departing from the disclosure. To illustrate an example, some devices may not be associated with an IP address without departing from the disclosure. For example, one or more devices (e.g., sensor device or component, although the disclosure is not limited thereto) may connect to the supporting device(s) 120 via a wireless connection to a hub device or a wired connection to another device 110/112/114 and may therefore not be associated with an individual IP address. Additionally or alternatively, the device registry 1520 may indicate the IP address of the hub device for each of the one or more devices without departing from the disclosure.

Figure 17:
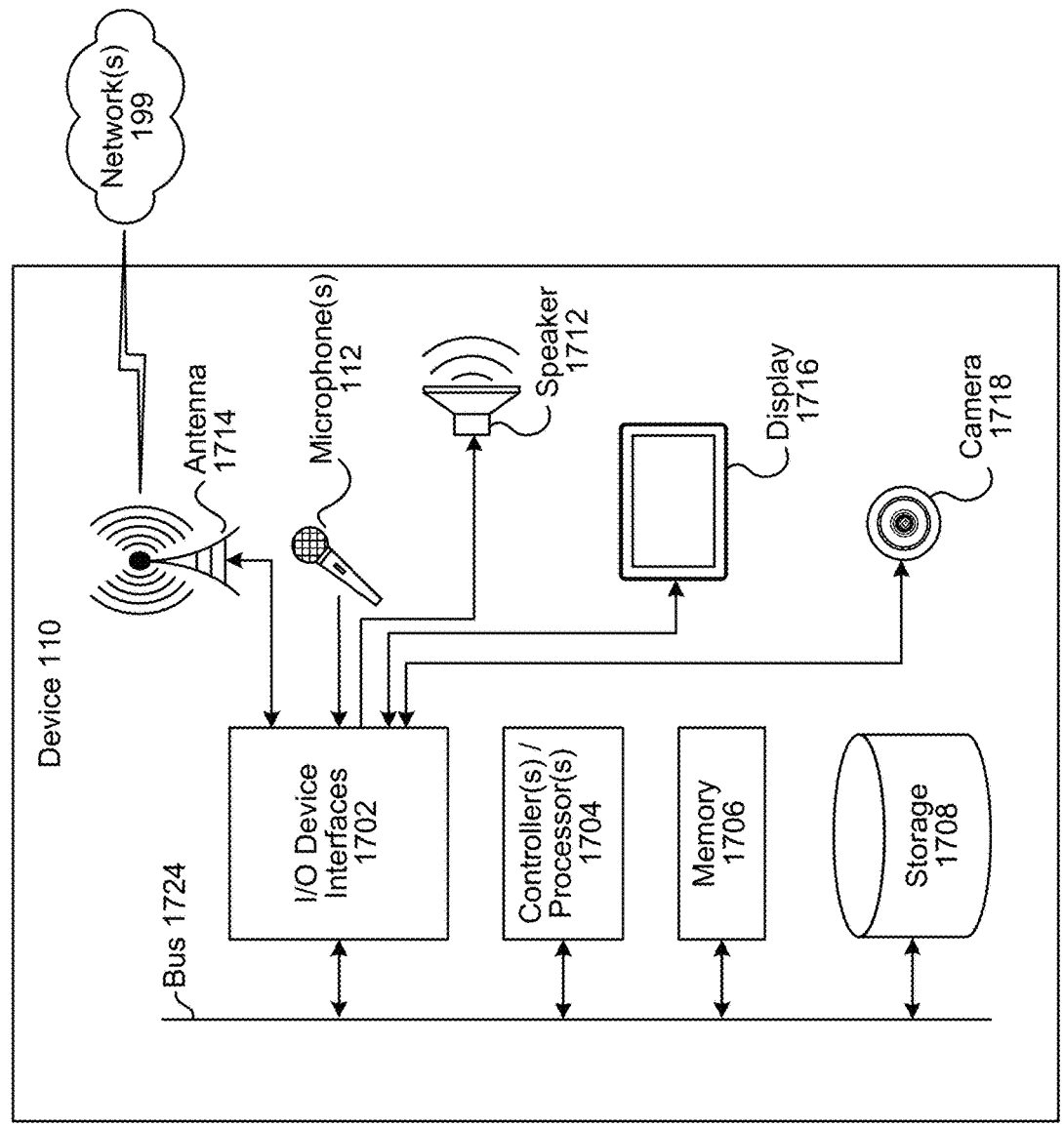
FIG. 17 is a block diagram conceptually illustrating example components of a device, according to embodiments of the present disclosure.

FIG. 17 is a block diagram conceptually illustrating a device 110 that may be used with the system. FIG. 18 is a block diagram conceptually illustrating example components of supporting device(s) 120, such as a natural language command processing device, which may assist with ASR processing, NLU processing, etc. The supporting device(s) 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/supporting device(s) 120 may be located remotely from the device 110 as its operations may not require proximity to the user. The server/supporting device(s) 120 may be located in an entirely different location from the device 110 (for example, as part of a cloud computing system or the like) or may be located in a the same environment as the device 110 but physically separated therefrom (for example a home server or similar device that resides in a user's home or business but perhaps in a closet, basement, attic, or the like). One benefit to the server/supporting device(s) 120 being in a user's home/business is that data used to process a command/return a response may be kept within the user's home, thus reducing potential privacy concerns.

Multiple supporting device(s) 120 may be included in the overall system 100 of the present disclosure, such as one or more natural language processing devices for performing ASR processing, one or more natural language processing devices for performing NLU processing, etc. In operation, each of these supporting devices 120 may include computer-readable and computer-executable instructions that reside on the respective supporting device(s) 120, as will be discussed further below.

Each of these devices (110/120) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/120) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1702/1802).

Computer instructions for operating each device (110/120) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/120) includes input/output device interfaces (1702/1802). A variety of components may be connected through the input/output device interfaces (1702/1802), as will be discussed further below. Additionally, each device (110/120) may include an address/data bus (1724/1824) for conveying data among components of the respective device. Each component within a device (110/120) may also be directly connected to other components in addition to (or instead of) being connected to other components across the bus (1724/1824).

Referring to FIG. 17, the device 110 may include input/output device interfaces 1702 that connect to a variety of components such as an audio output component such as one or more loudspeaker(s) 1712, a wired headset or a wireless headset (not illustrated), or other component capable of outputting audio. The device 110 may also include an audio capture component. The audio capture component may be, for example, one or more microphone(s) 112 or array of microphones, a wired headset or a wireless headset (not illustrated), etc. If an array of microphones 112 is included, approximate distance to a sound's point of origin may be determined by acoustic localization based on time and amplitude differences between sounds captured by different microphones of the array. The device 110 may additionally include a display 1716 for displaying content. The device 110 may further include a camera 1718.

Via antenna(s) 1714, the input/output device interfaces 1702 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1702/1802) may also include communication components that allow data to be exchanged between devices such as different physical servers in a collection of servers or other components.

The components of the device(s) 110 and/or the supporting device(s) 120 may include their own dedicated processors, memory, and/or storage. Alternatively, one or more of the components of the device(s) 110 and/or the supporting device(s) 120 may utilize the I/O interfaces (1702/1802), processor(s) (1704/1804), memory (1706/1806), and/or storage (1708/1808) of the device(s) 110 and/or the supporting device(s) 120, respectively. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, and the supporting device(s) 120, as described herein, are illustrative, and may be located as a stand-alone device or may be included, in whole or in part, as a component of a larger device or system. As can be appreciated, a number of components may exist either on the supporting device(s) 120 and/or on the device 110. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 19, multiple devices (110a-110e, 120) may contain components of the system and the devices may be connected over a network(s) 199. The network(s) 199 may include a local or private network or may include a wide network such as the Internet. Devices may be connected to the network(s) 199 through either wired or wireless connections. For example, device(s) with display 110*a*, device(s) 110*b*, an input/output limited device 110*c*, a display/smart television 110*d*, and/or a motile device 110*e* may be connected to the network(s) 199 through a wireless service provider, over a Wi-Fi or cellular network connection, or the like. Other devices are included as network-connected support devices, such as the natural language command processing system, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as an ASR component, an NLU component, etc. of a natural language command processing system.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   determining, by a device, first audio data representing first audio to be output by the device;
   extracting, from the first audio data, first lighting data;
   detecting, by the device prior to output of the first audio, a first representation of a first keyword in the first audio data;
   determining, by the device, a first action associated with the first keyword, the first action to be performed by a first output device in coordination with output of the first audio;
   sending, from the device to the first output device, a first command associated with the first action; and
   causing output of a first visual effect using the first lighting data.

2. The computer-implemented method of claim 1, further comprising:
   generating, by the device using the first audio data, the first audio including a second representation of the first keyword; and
   causing the first output device to perform the first action, wherein the first action is coordinated with the second representation of the first keyword in the first audio.

3. The computer-implemented method of claim 1, wherein sending the first command further comprises:
   determining a network address associated with the first output device; and
   sending, from the device to the first output device, using the network address and a wireless personal area network (WPAN) protocol, the first command.

4. The computer-implemented method of claim 1, wherein determining the first audio data further comprises:
   receiving, by the device using a wireless local area network (WLAN) protocol, the first audio data, and
   the method further comprises:
   generating, by the device, the first audio using the first audio data.

5. The computer-implemented method of claim 1, further comprising:
   generating, by the device using a microphone, second audio data representing speech;
   detecting a representation of a second keyword in the second audio data;

determining, by the device, a second action associated with the second keyword, the second action to be performed by the first output device in response to the second keyword; and
causing the first output device to perform the second action.

6. The computer-implemented method of claim 1, further comprising:
receiving, by the first output device using a wireless personal area network (WPAN) protocol, the first command; and
performing, by the first output device, the first action.

7. The computer-implemented method of claim 1, wherein determining the first audio data further comprises:
receiving, by the device using a wireless local area network (WLAN) protocol, the first audio data,
wherein extracting the first lighting data further comprises:
generating, using a least significant bit (LSB) of the first audio data, the first lighting data.

8. The computer-implemented method of claim 1, further comprising:
determining that the first audio data includes a representation of a first audible sound that is associated with a first direction relative to the device;
determining that the first direction corresponds to a second output device; and
causing, by the second output device, output of a second visual effect.

9. The computer-implemented method of claim 1, further comprising:
determining a number of amplitude peak values represented in the first audio data;
determining, using the number of amplitude peak values, a hue value corresponding to a first color and a saturation value indicating an amount of saturation associated with the first color;
generating second lighting data that includes the hue value, the saturation value, and an output intensity value indicating an amount of brightness associated with the first color; and
causing output of a second visual effect using the second lighting data.

10. The computer-implemented method of claim 1, further comprising:
determining a first value indicating a first amount of energy represented in a first frequency range of the second audio data;
determining, using the first value, second lighting data;
generating, by the device, the first audio using the first audio data; and
causing output of a second visual effect using the second lighting data.

11. A system comprising:
at least one processor; and
memory including instructions operable to be executed by the at least one processor to cause the system to:
determine, by a device, first audio data representing first audio to be output by the device;
detect, by the device prior to output of the first audio, a first representation of a first keyword in the first audio data;
determine, by the device, a first action associated with the first keyword, the first action to be performed by a first output device in coordination with output of the first audio;
send, from the device to the first output device, a first command associated with the first action;
determine that the first audio data includes a representation of a first audible sound that is associated with a first direction relative to the device;
determine that the first direction corresponds to a second output device; and
cause, by the second output device, output of a first visual effect.

12. The system of claim 11, wherein the memory further comprises instructions that, when executed by the at least one processor, further cause the system to:
generate, by the device using the first audio data, the first audio including a second representation of the first keyword; and
causing the first output device to perform the first action, wherein the first action is coordinated with the second representation of the first keyword in the first audio.

13. The system of claim 11, wherein the memory further comprises instructions that, when executed by the at least one processor, further cause the system to:
determine a network address associated with the first output device; and
send, from the device to the first output device, using the network address and a wireless personal area network (WPAN) protocol, the first command.

14. The system of claim 11, wherein the memory further comprises instructions that, when executed by the at least one processor, further cause the system to:
receive, by the device using a wireless local area network (WLAN) protocol, the first audio data; and
generate, by the device, the first audio using the first audio data.

15. The system of claim 11, wherein the memory further comprises instructions that, when executed by the at least one processor, further cause the system to:
generate, by the device using a microphone, second audio data representing speech;
detect a representation of a second keyword in the second audio data;
determine, by the device, a second action associated with the second keyword, the second action to be performed by the first output device in response to the second keyword; and
cause the first output device to perform the second action.

16. The system of claim 11, wherein the memory further comprises instructions that, when executed by the at least one processor, further cause the system to:
receive, by the first output device using a wireless personal area network (WPAN) protocol, the first command; and
perform, by the first output device, the first action.

17. The system of claim 11, wherein the memory further comprises instructions that, when executed by the at least one processor, further cause the system to:
receive, by the device using a wireless local area network (WLAN) protocol, the first audio data;
generate, using a least significant bit (LSB) of the first audio data, first lighting data; and
cause output of a second visual effect using the first lighting data.

18. The system of claim 11, wherein the memory further comprises instructions that, when executed by the at least one processor, further cause the system to:
determine a number of amplitude peak values represented in the first audio data;

determine, using the number of amplitude peak values, a hue value corresponding to a first color and a saturation value indicating an amount of saturation associated with the first color;

generate first lighting data that includes the hue value, the saturation value, and an output intensity value indicating an amount of brightness associated with the first color; and cause output of a second visual effect using the first lighting data.

19. The system of claim 11, wherein the memory further comprises instructions that, when executed by the at least one processor, further cause the system to:

determine a first value indicating a first amount of energy represented in a first frequency range of second audio data;

determine, using the first value, first lighting data;

generate, by the device, the first audio using the first audio data; and causing output of a second visual effect using the first lighting data.

20. The computer-implemented method of claim 1, wherein the first lighting data includes an intensity value corresponding to the first visual effect.

21. The computer-implemented method of claim 1, wherein the first lighting data indicates a first color and an amount of brightness associated with the first color.

22. The computer-implemented method of claim 1, wherein the first lighting data includes a first value indicating a first color, a second value indicating an amount of saturation associated with the first color, and a third value indicating an amount of brightness associated with the first color.

* * * * *